US00RE40692E

(19) United States
(12) Reissued Patent
Rose, Jr.

(10) Patent Number: US RE40,692 E
(45) Date of Reissued Patent: Mar. 31, 2009

(54) UNIFORM SYSTEM FOR VERIFYING AND TRACKING THE TITLE OF ARTICLES OR OBJECTS OF VALUE

(75) Inventor: R. Edward Rose, Jr., Hingham, MA (US)

(73) Assignee: Unitrac, LLC, Hingham, MA (US)

(21) Appl. No.: 11/894,022

(22) Filed: Aug. 17, 2007

Related U.S. Patent Documents

Reissue of:
(64) Patent No.: 6,076,064
Issued: Jun. 13, 2000
Appl. No.: 09/035,275
Filed: Mar. 9, 1998

U.S. Applications:
(63) Continuation-in-part of application No. 08/653,583, filed on May 24, 1996, now abandoned, which is a continuation of application No. 08/103,917, filed on Aug. 9, 1993, now Pat. No. 5,521,815, which is a continuation-in-part of application No. 07/830,078, filed on Jan. 31, 1992, now abandoned.

(51) Int. Cl.
*G06Q 99/00* (2006.01)

(52) U.S. Cl. ..... 705/1; 705/28; 705/31

(58) Field of Classification Search ..... 705/1, 705/7, 22, 28, 30, 31; 235/375, 385; 700/236
See application file for complete search history.

(56) References Cited

U.S. PATENT DOCUMENTS

| | | | | | |
|---|---|---|---|---|---|
| 4,952,785 | A | * | 8/1990 | Kikuda | 235/432 |
| 4,970,655 | A | * | 11/1990 | Winn et al. | 700/235 |
| 4,989,144 | A | * | 1/1991 | Barnett, III | 705/29 |
| 5,285,383 | A | * | 2/1994 | Lindsey et al. | 705/26 |
| 5,351,302 | A | * | 9/1994 | Leighton et al. | 380/30 |
| 5,521,815 | A | * | 5/1996 | Rose, Jr. | 705/28 |
| 5,899,978 | A | * | 5/1999 | Irwin | 705/1 |

* cited by examiner

*Primary Examiner*—Dennis Ruhl
(74) *Attorney, Agent, or Firm*—Lorusso & Associates

(57) ABSTRACT

A uniform, centralized system for converting all existing systems into one unique, universal system which allows for tracking those titles for articles objects of value, such as motor vehicles, boats, land, antiques insurance files, etc., in a congruent and continual manner. The system provides a centralized computer data base(s) operating in a "client-server" computer environment for use in creating a title history file, and for assigning a singular registration number and identification number from the VIN (or other) identifying number with those numbers being coded, and creating a coded title and registration number and for storing relevant data on the item. The centralized data base is connected to various authorized agents such as insurance agents and car dealers, and to governmental agents such as department of motor vehicles and tax collecting entities. In this way, all relevant data on an item can now be is maintained on a centralized system which is accessible to all who need the information.

29 Claims, 21 Drawing Sheets

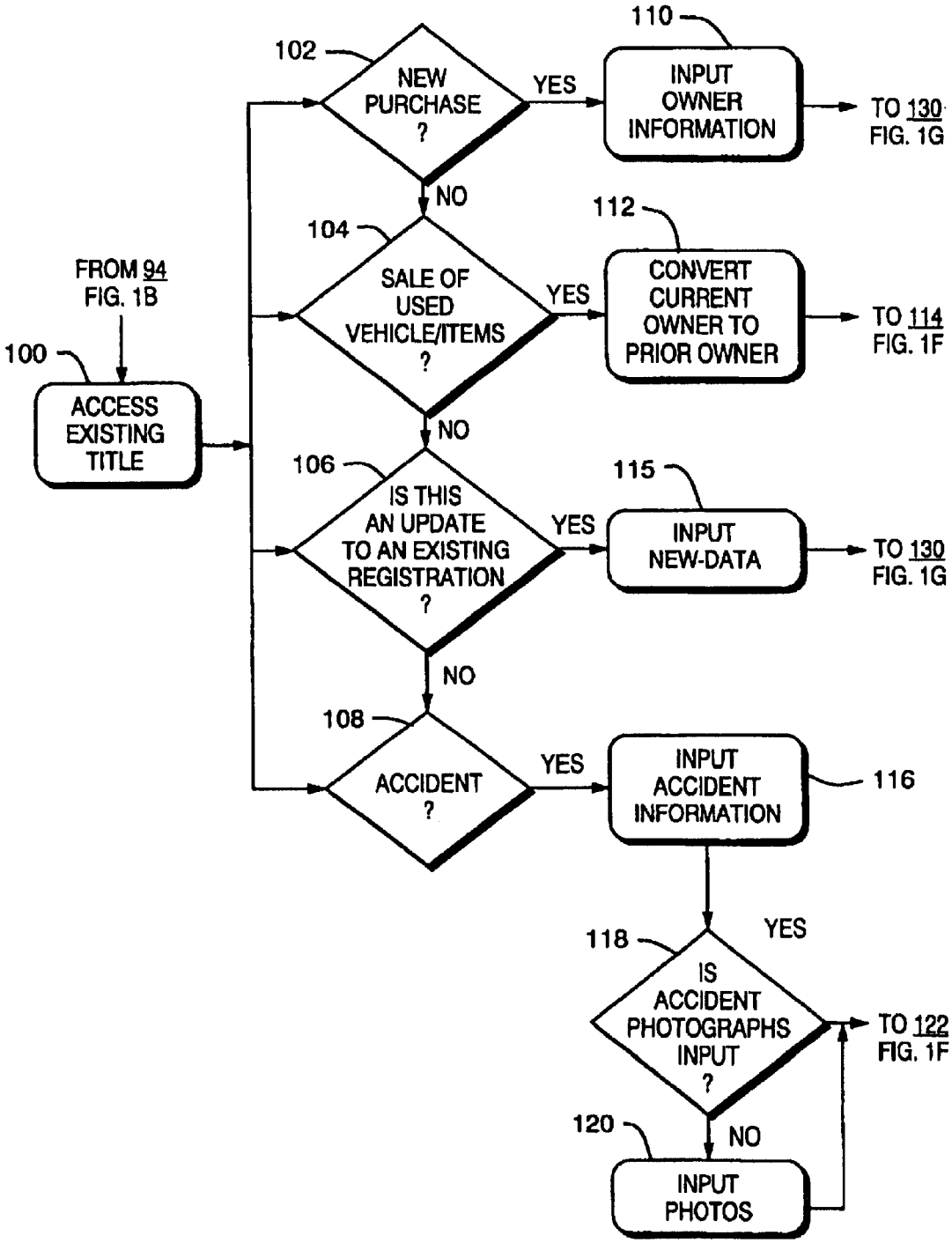
FIG. IE

| ASCII SYMBOL | ASCII VALUE |
|---|---|
| A | 065 |
| B | 066 |
| C | 067 |
| D | 068 |
| E | 069 |
| F | 070 |
| G | 071 |
| H | 072 |
| I | 073 |
| J | 074 |
| K | 075 |
| L | 076 |
| M | 077 |
| N | 078 |
| O | 079 |
| P | 080 |
| Q | 081 |
| R | 082 |
| S | 083 |
| T | 084 |
| U | 085 |
| V | 086 |
| W | 087 |
| X | 088 |
| Y | 089 |
| Z | 090 |

| ASCII SYMBOL | ASCII VALUE |
|---|---|
| 0 | 048 |
| 1 | 049 |
| 2 | 050 |
| 3 | 051 |
| 4 | 052 |
| 5 | 053 |
| 6 | 054 |
| 7 | 055 |
| 8 | 056 |
| 9 | 057 |
| - | 045 |
| (SPACE) | 032 |
| . | 046 |
| , | 044 |
| + | 063 |
| = | 061 |
| @ | 064 |

FIG. 7

| | | | |
|---|---|---|---|
| | MS | 1.9679 | |
| | MA | 1.8263 | |
| | GA | 1.7779 | |
| | MT | 1.7327 | |
| | AZ ; NM | 1.7208 | |
| | MN ; LA | 1.5135 | |
| | AL | 1.3929 | |
| | NY | 1.3740 | |
| | FL | 1.3400 | |
| | TN | 1.2472 | |
| | AR | .1400 | |
| | ME | .8847 | |
| | SC | .8829 | |
| | TX | .7686 | |
| | NH | .7678 | |
| (UTAH) | CA | .7413 | |
| | CT | .6477 | |
| | KS | .5806 | |
| | UT | .5571 | |
| | MO | .5554 | |
| | KY | .4722 | |
| | AK | .4390 | POSITIVE VALUES OF SIN (X) |
| | NC | .4285 | |
| | NE | .3992 | |
| | MI | .3227 | |
| | IA | .1500 | |
| | VA | - .1967 | |
| | IL | - .1107 | NEGATIVE VALUES OF SIN (X) |
| | OR | - .1309 | |
| | IN | - .1628 | |
| | PA | - .1671 | |
| | OH | - .190317 | |
| | VT | - .190284 | |
| | RI | - .3636 | |
| | ND | - .3839 | |
| | NV | - .4095 | |
| | HI | - .4230 | |
| | NJ | - .4711 | |
| WASH. | CO | - .5296 | |
| | OK | - .8319 | |
| (WEST VA) | D.C. | - .9834 | |
| | DE | [illegible] | |

SIN(X) VALUES FOR X=STATE SPECIFIC ASCII CODE

FIG. 8

UNIFORM SYSTEM FOR VERIFYING AND TRACKING THE TITLE OF ARTICLES OR OBJECTS OF VALUE

Matter enclosed in heavy brackets [ ] appears in the original patent but forms no part of this reissue specification; matter printed in italics indicates the additions made by reissue.

CROSS-REFERENCE TO RELATED APPLICATION

This *is a reissue application of U.S. Pat. No. 6,076,064, issued Jun. 13, 2000, which matured into a patent from U.S. Ser. No. 09/035,275, filed Mar. 9, 1998, which* is a continuation-in-part application of [Ser.] *Ser.* No. 08/653,583, filed May 24, 1996, now abandoned, which is a continuation application of [Ser.] *U.S. Ser.* No. 08/103,917, filed Aug. 9, 1993, now U.S. Pat. No. 5,521,815, [which is] *issued May 28, 1996, which is the subject of Reissue application Ser. No. 11/894,023 filed Aug. 17, 2007, the 08/103,917 application being* a [Continuation-In-part] *continuation-in-part* application of U.S. [Ser.] *Ser.* No. 07/830,078, filed Jan. 31, 1992, now abandoned, [and] the contents *all* of which are incorporated *herein* by reference [herein].

The invention relates to data processing methodology and apparatus for effecting a universal, uniform system for tracking transactions for tangible and intangible items objects or of value, such as motor vehicles, boats, antiques, artwork, and real property. More precisely, it relates to a computerized system by which all current systems are converted in a uniform manner to a unique but universal system, by creating and then centralizing, that single system as the single source of the tracking system so that data may be input from a variety of sources and accurate, up-to-date titles and registrations may be created and issued in a congruent and continual manner. Once verified as to authenticity and converted from the current system(s) titles may then be created and re-issued and/or, if the article is new, put directly on the proposed system.

BACKGROUND OF THE INVENTION

A need exists for a universal, centralized uniform system for tracking titles on items of value from a point of sale device for articles or objects of value, such as motor vehicles, boats, antiques, artwork, and real estate. As used herein, the term "object" shall mean all tangible and intangible items including by way of illustration but not limitation, automobiles, boats, real estate, bank accounts, insurance files, patents, assignments, bills of lading, manifests, research files etc. Although records for those items are currently maintained by various unrelated parties they are disparate, off-site locations. Further, there is no current universal system or means for universally centralizing all records to ensure that all information is up to date and accurate and that may be accessed by various, unrelated parties at a point of sale in a "client-server" atmosphere.

The failure(s) of the current tracking system(s) are particularly obvious when the articles are sold, and the purchaser (and/or lender) wants verification that the title is accurate. In the case of motor vehicles or boats, where titles are currently issued by the Department of Motor Vehicles (DMV), the titles are often of little value. In many states a dealer or an owner, or a thief, is able to obtain a new title to a vehicle simply by informing the DMV that the original title was lost or by changing jurisdictions, or some similar ploy. In this way, a dealer or anyone else could easily obtain a title for a stolen or salvaged vehicle with no indication on that title that the vehicle is a salvaged vehicle or is or was, stolen.

The current systems, according to recent FBI (Federal Bureau of Investigation) statistics, cost the owners of motor vehicles, and their insurance over $9B (nine billion dollars) in paid claims on motor vehicles alone, and another estimated $12–13B (twelve to thirteen billion dollars) in related damages for vehicle theft and theft-related fraud annually.

With fraudulent titles so easily obtainable, it is difficult, if not impossible, to find an insurance company willing to issue a title insurance policy. Thus, the purchaser usually bears all the risk of loss. It would be desirable to provide a uniform system for tracking all titles and that will insure that the titles are accurate, congruent and continual.

A further problem with the existing titles is that even if they are accurate, they do not contain enough information for the prospective buyer, and are not of a congruent or continual nature. Although extensive records are maintained by insurance companies with respect to damage to vehicles, thefts, major repairs, and salvage value, there is no universal system by which records are systemized and centralized within a data base that stores, converts and classifies all of this information, and there is currently no system for incorporating that information in a congruent and continual manner on the title. Such information would not only be useful for the buyer, but would also enhance the value of the article to the seller because he could provide the buyer with a verified history of the vehicle in a congruent and continual manner. None of the current systems are inter-connected and therefore the system lends itself to redundancy, fraud, inaccuracy and confusion. For example, in the case of a motor vehicle, at least three parties make detailed records independently of one another, (1) the manufacturer stamps a vehicle information number (VIN) on the vehicle which is coded to reveal particular information about the vehicle, (2) each individual jurisdiction (state) or district then issues a "new" title number each time a vehicle changes owners, (3) and new registration plates and related documents every time insurance or ownership changes, (4) the insurance industry maintains totally separate and different information, and (5) towns, cities and state agencies all maintaining separate, disparate and incommunicable information.

The current practice among manufacturers of most valuable goods is to imprint a serial number, or identifying number on the item before it leaves the manufacturing plant. The serial number is coded to reveal various information about the article, such as the year of manufacture, the manufacturing plant, and the particular style. In the case of motor vehicle, for example since 1980, a 17 character vehicle identification number (VIN) is imprinted on each vehicle. The VIN is coded so that the first eleven characters usually represent the following: country of origin, vehicle type, number of passengers, restraint system, car manufacturer model identification, vehicle series, body type description, engine size, a check digit, model year and manufacturing plant. The last six digits are different for each vehicle and serve to identify a particular vehicle.

However, the DMV issues a completely different title number and a different registration plate number; the insurance agent and/or company also maintains a completely separate record of the vehicle which includes information regarding the value of the vehicle, accidents, and repairs to the vehicle and insurance coverage; etc. and the DMV maintains yet another separate record of the ownership of the vehicle drivers of the vehicle, etc. Other government agencies may also maintain separate records for tax collecting purposes. There is no current system which integrates the information maintained separately by each of those parties in a universal, continual and congruent manner. It would also be desirable to expand the tracking system to provide for the tracking of subparts of the items. This would significantly reduce the incidence of thefts of automobiles and parts thereof; i.e., "chop-shop" activities.

A further problem is that there exists no centralized system which can be accessed by everyone. There are 51 jurisdiction(s) in the United States, each having its own version of the title, license plates, vanity plates, etc. Titles and registration plates vary dramatically from jurisdiction to jurisdiction, but all track the owner(s) of the vehicle and not the asset (vehicle).

Every time an asset changes ownership, a completely new and unrelated set of documents are created, thereby necessitating that all disparate systems (and database) must upgrade their system(s). This creates serious problems (if not impossible) to maintain all disparate databases with continual and congruent information. The current system(s) becomes even more complicated as requirements vary from jurisdiction to jurisdiction.

For tracking replacement parts, current systems have dissimilar multi-key tracking. The VIN; the Title; and the registration license plate must be combined, and the three keys "matched" to the owner, and then sent to another file or data base program to "contextually cross-match" the data files to see if there is a match (as disclosed in U.S. Pat. No. 4,989,144 to Barnett III) and then one must reverse the process back to all three or four "data-tracking keys" to update each file in the disparate data bases while still maintaining a further "contexually-matched" data base.

Further, there is no known current system to reach the data base(s) at the 700–800 insurance companies; the title holder's data base (DMV's); the insurance agencies' data bases; the automobile manufacturer's data base(s); and autodealership; current owner; the prospective buyer(s), etc. Many others are left out of the loop (i.e., local and state police; customs inspection stations; the FBI; cities and towns, and court systems, banks and financial agencies, etc.).

While all existing systems have their search procedures at least partly tied to the VIN, no existing system converts the VIN to a title number and registration number as a complete triangulated method, thereby universalizing the VIN beyond its original intended use. This unique method allows for massive amounts of heretofore, uncorrelated data to be controlled in a continual and congruent manner.

Current systems vary from state to state as to the permanency of the license plates. Some states, such as California and Texas issue "permanent" license plates assigned to a particular vehicle, but in fact they have no relation to the vehicle itself and can easily be lost or stolen with no current methods of tracking that license plate outside of the current owner. In certain states, the registration plate of the vehicle can take the form of a "special use", or "vanity plate" or environmental plate. Many states use these vanity and environmental plates to raise-additional revenue, thereby confusing an already difficult system.

Every state uses some type of random numbering sequence to create a new license plate number. In other words, the number on the plate usually bears no relationship to the vehicle at all, but rather to the owner or "class" of owner(s); i.e., states, auto-dealers, government agencies, etc.

A further problem with the existing systems is the redundancy and cost associated with having various different entities maintaining separate data bases and methods of tracking, each having its own room for error. Under the existing systems, each one of the individual(s) or groups must maintain their own data base and method of tracking. Therefore, these errors compound themselves dramatically depending on the type of error and/or omission and how many databases rely on that information in its "correct" form.

One attempt to protect against fraud in motor vehicle transactions is disclosed in U.S. Pat. No. 4,989,144 to Barnett III. It teaches to identify discrepancies in existing vehicle title information by gathering recent title transaction data from a plurality of sources indexed by the VIN. It then adds records to a master data base having a plurality of standard variable format transaction records indexed by the VIN. When a report is requested, all records indexed by the same VIN are selected and discrepancies are identified by "contextual analysis". One of the problems associated with this system is that it relies on a comparison of records kept by others. It does not correct any discrepancies in the titles nor does it provide any means for eliminating the errors when the data is originally input into the various data base. Further-more, it requires that data be kept by various, independent entities, and then redundantly researched time and time again (even for that same vehicle) because that vehicle may change jurisdictions and/or owners many times in its life-cycle. Further, it will be readily apparent that 1000 vehicles can be reviewed "contextually" with ease, but 200 million vehicles become much more difficult.

In cases where titles are not currently issued, and the articles are not marked with a serial number, such as antiques or artwork, the existing system provides no protection to the buyer. No centralized system exists to maintain records on such items that can be used to verify with simplicity the authenticity and ownership of the article. It would be desirable to provide a centralized universal system which could provide those features. In addition to protecting the buyer, the system would fairly report the value of the items to the owner because of the proposed system's capability to authenticate and document the ongoing history and other pertinent facts that a prospective buyer, existing owner, or others may need to rely upon.

Thus, it is an object of the present invention to provide a centralized uniform system for maintaining up-to-date and accurate titles of all objects of value throughout that object's life-cycle.

It is another object of the present invention to reduce the incidence of fraud involved within the titling process and with the issuance of false titles to articles of value.

It is another object of the present invention to protect banks, other lenders and owners against fraudulent loan transactions.

It is yet another object of the invention to protect insurers against theft and theft-related fraud.

It is yet another object of the invention to supply accurate, congruent and meaningful information about the incidence and nature of accidents (even by type and model of vehicle).

It is yet another object of the invention to completely eliminate the "after-market" for stolen vehicles, boats, etc. and their sub-parts and therefore, deter or eliminate theft and theft-related fraud.

It is yet another object of the invention to assist buyers and sellers alike in arriving at heretofore unavailable information to reduce the unnecessary burden and expense caused them.

It is yet another object of the present invention to assist police in identifying stolen items while protecting their personal safety.

It is yet another object of the present invention to make title information accessible by all authorized entities.

It is yet another object to eliminate the redundancy involved when various parties maintain separate records of the same transaction.

It is another object of the present invention to supply updates and related information, with specificity, regarding any item tracked by this system in a congruent and continual manner.

It is yet another object of the present invention to track on the title with certainty, all pertinent parts and fixtures belonging to a total item, i.e., all of the major components that bear a manufacturer's serial number in order to eliminate improper or unauthorized substitutions of those major compounds,in a congruent and continual manner.

It is yet another object of the invention to track on the title with certainty, all major marked (VIN stamped) parts and fixtures both from the vehicle being dismantled and whence going to the vehicle (or boat) being re-built.

It is yet another object of the invention to track on the title with certainty and specifically all tax-collecting, tax valuating, insurance collecting, insurance valuating, back lending, bank valuating information.

SUMMARY OF THE INVENTION

These and other objectives of the present invention are achieved by providing a centralized computer data base operating under the control of a uniform system supplying continual and congruent information in a client-server atmosphere.

The centralized computer data bases are connected via computer modem/RF device, or other telecommunication device to all parties ordinarily involved in transactions relating to the article. For example, in the case of a motor vehicle, the centralized data base may be connected via computer mode/RF system and/or telephone lines to the insurance agent, the car dealer, and the DMV. In the case of artwork, the centralized data base may be connected to the art dealers, and insurance companies. In the case of real estate, the centralized data base may be connected to the Land Courts and to the Registry of Deeds.

In all cases, the centralized computer data base(s) operate (s) under the system control of a universal title system with an authorized entity which is responsible for complete tracking of the title and authorizing the appropriate party to issue titles to the articles or objects of value regardless of jurisdiction and/or location.

The invention provides two variations of the system, one directed to articles or objects of value having serial numbers or other identifying number assigned by the manufacturer , i.e. motor vehicles and boats; and the other directed to articles or objects of value without manufacturer assigned serial numbers, such as artwork, antiques, and real estate.

In the case of articles having serial numbers, the serial number is transmitted by an authorized agent to the centralized data base. The authorized agent may be the insurance agent, the authorized dealer, or any other agent authorized by the title company or government-authorized entity. The data base has, at a minimum, storage locations corresponding to each of the characters of the serial number, plus those necessary for expansion of the system to accommodate current to future changes to the VIN or title-related changes in federal and state law(s).

The system then accesses the predetermined storage locations to assign a title number and a registration number that is identical to the serial number plus the original state of entry, origin or titling. In cases where the title number is too long to place on the article itself, the computer may assign a shortened version of the registration number to be affixed to the goods, i.e., in the case of a motor vehicle, the shortened version of the registration number would be printed on the license plate. However, a bar-coded version (or similar encoding method) with the complete title number will be affixed to said registration plate. Since manufacturer's serial numbers are often coded to reveal various information, such as the year of manufacture, etc. that information is automatically indicated on the registration number or the title number. In this manner, the title, the registration and the VIN are tied directly to the vehicle and cannot be switched without easy and immediate detection.

Note, according to automobile industry and FBI statistics, there were at least 190,741,840 motor vehicles registered in the United States alone, with California, Texas and New York states housing the largest single-state population of vehicles. However, there are forty-eight (48) other jurisdictions including Alaska, Hawaii and the District of Columbia. Therefore, said centralized system must be uniform in nature and content and be capable of analyzing approximately two hundred million records.

In the current system(s), as previously explained, one must currently contextually analyze the records of fifty-one (51) separate jurisdictions for ownership files; VIN files; title files and registration files in order to "match" the vehicle properly.

In typical jurisdictions, a license plate will contain up to seven alpha-numeric symbols arranged in a random manner, and having no relationship to the vehicle, but only to the current owner; also, the VIN currently has seventeen (17) alpha-numeric symbols (a universal standard) having specific information related to the vehicle (and not the owner); and the title has both the registration number and the VIN one of which changes each time the insurer changes. Compound this mathematically by each separate fifty-one (51) jurisdiction and one has a tracking nightmare.

In the proposed system, the new plate (registration) is encoded to the VIN/title number and if three alpha symbols and six numeric symbols are used, there are up to $17.576\times 10^9$ possible combinations that must be assigned and verified by the computer program in order to avoid redundancy.

This number can be expanded or reduced depending upon the particular items being registered using the encoding system. After the initial step of assigning the serial number or VIN of the article as the title number, all three numbers, the VIN; the title number and the registration number are congruent.

Once assigned, the registration number, title number and serial number remain with the article throughout the life of the article. This uniform system ensures that the VIN; title number, and registration numbers are directly tied to the article itself, and that each article will have one and only one title number, serial number/VIN and registration I.D. number. If the title is lost, the owner can simply have the serial (VIN) number input into the computer data base to access the title. In this way, each article will have one and only one title number and registration number, both of which stay with the article throughout its life-cycle.

In cases where the article has no serial number, i.e., art work or antiques, information such as the nature and title of the work, author, date of origin, etc. is transmitted to the centralized data base. The computer sets up storage locations corresponding to certain identifying features of an article.

When certain identifying features of the article are input to the computer, they are routed to the corresponding storage locations. The computer then generates an identifying number based on the locations of those identifying features. The computer also sets up appropriate locations to allow for photo-image filling of the item being titled or the vehicle being titled and insured. Normally, most items of value are insured, and this information may now be transmitted to the data base by any insurer. The transmission of data may also be performed by the dealer, the insurer, the manufacturer, or any other authorized entity. The system also requires that verification of the authenticity or value of the article be submitted initially and that once authenticated, it will only require updates to changes of ownership, condition, insurance, vehicle inspections, etc.

The computerized data base may be connected to a graphics device which prints a tag bearing the title identification number and/or registration number. The graphics device imprints the number on the plate and allows for various designs and sizes as required. The tag is applied in a permanent fashion to the article where it would be practical to do so. In the case of the motor vehicle, the tag is in the form of a license plate. The license plate number (i.e., the "registration" number) is coded to the title number and VIN number and remains with the vehicle throughout the vehicle's lifetime, even as the vehicle is sold to new owners. By trying the registration number to the number imprinted on the vehicle by the manufacturer, the system ensures that license plates can never be switched and renders it useless to steal license plates, as they refer with specificity, to one unique vehicle. In addition, the registration plate will include a barcoded (or similar means) complete version of the new title number.

Once the title number and registration number are assigned (and the shortened registration number, when applicable) are created, the computer now is able to access an unlimited, title history file to record all important transactions pertaining to the article in a congruent and continual manner. The title history will, in general, include a list of all previous owners, the current owners, dates of purchase Bill of Sale, purchase prices, records of reported accidents or thefts, photo-images of the item or vehicle-original condition plus updated photo-images to show ongoing conditions as they may apply, including photo images and information on the authorized drivers and owners of the particular vehicle, and any other information which may be relevant, depending upon the type of article involved. For a simple example, in the case of the motor vehicle the title includes the odometer reading at each transaction. In the case of artwork, or antiques, the title indicates the type of verification shown to the insurance company or title company to authenticate the article.

Although the title history is maintained on the centralized computer data base under the control of the authorized master title entity, the actual title may be issued by the DMV, insurance company, or the dealer, or any authorized agent, depending upon the specific type of article involved. The authorized agent is connected via computer modem or RF system to the data base, and upon authorization from the title company, can issue plastic title identification cards, which are encoded with the owner's name, and the title number etc. as well as a legally acceptable and authorized title on unique paper forms and a legally acceptable copy of the title history.

The title identification cards are retained by the owner and submitted to the authorized agent upon transfer so that the title may be updated to reflect relevant data on the new owner, and any changes in the condition of the article. In this way, any purchaser gets a completely up to date title, and banks; insurers; and others get an updated continual and congruent history. In addition to the title identification cards, an original paper title is issued including photo-image files, along with photocopies of sane for the vehicle. The original is provided to either the lien holder or the owner, depending upon whether a secured lender is involved. The plastic title cards serves as a permanent "registration" for the vehicle because the license plates never change. This system thereby provides for maximum security against theft and theft-related fraud. Using technology such as that disclosed in U.S. Pat. No. 4,879,747 to Leighton et al. for a method of encryption can be used to further protect against fraudulent use of documentation produced by the central system. Unlike the existing system which allows for either the registration plate or the VIN to be stolen or altered to accomplish fraud and/or theft, the new system must have all four components inviolate before a successful fraud and/or theft can take place.

However, even if the thief or fraud perpetrator is successful in stealing and/or altering the article of value and recreates all four components in order to match a fake VIN, he forged article cannot now re-enter the marketplace because it will immediately show up on the central system as a fraudulent article with a completely different set of statistics and (no history). This is totally different than the current system wherein all one has to do is move the article of value to another jurisdiction and re-title that article because no current system can verify with specificity whether the article is genuine or fake.

The computerized central data base is connected by computer modem, RF device and/or other communication devices to various parties involved in the article so that the title may be updated even when no exchange is involved. For example, where the article is insured, as most articles of value are, the insurance agent has access to the data base and updates the title to reflect any damage and subsequent repairs to the articles. Thus, whenever a buyer purchases an item he can simply look at the title and learn the complete history of the article. Furthermore, all insurance companies are able to easily share central information on particular vehicles or items. This is particularly useful in automobile transactions where severely damaged and/or totaled vehicles are often repaired and subsequently sold as if they were in "good condition" subsequently.

The centralized computer data base has wide applications. It may be tied to the state agencies for use in collecting personal property tax. It would also be valuable in compiling statistics on theft and damage to articles, etc. because it is now a centralized source of data for those particular items.

BRIEF DESCRIPTION OF THE DRAWINGS

FIG. 7 shows the ASC II code values corresponding to the alpha numeric symbols; and FIG. 8 shows the sin values for each state.

DETAILED DESCRIPTION OF THE PREFERRED EMBODIMENT

FIGS. 1A–1H refer to the preferred embodiment of the invention which is directed to an improved system for tracking motor vehicles. It will be understood, however that this system may be modified for use with any articles or objects of value having serial numbers assigned by the manufacturer. The system may also be modified for use with articles or objects of value not having a manufacturer assigned serial number.

Figure 2:
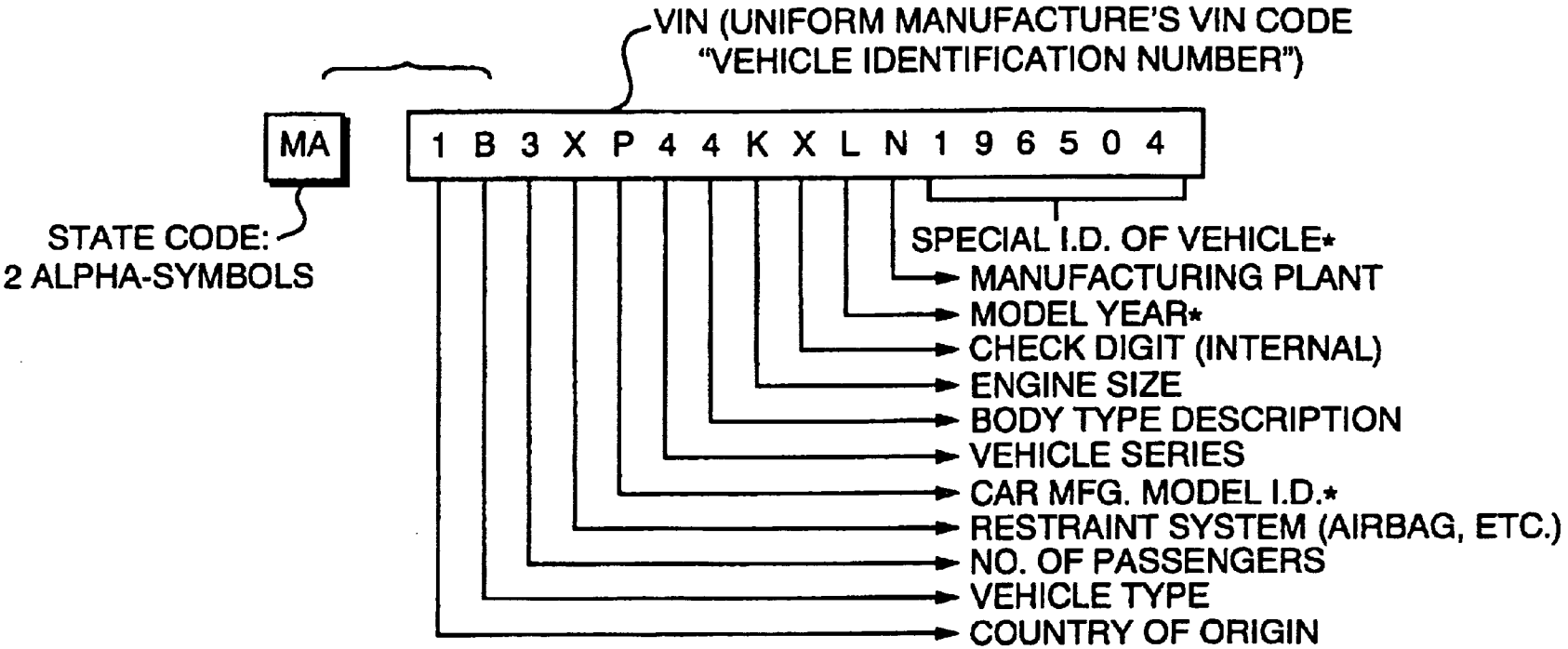
FIG. 2 shows the coding of a typical VIN for a 1990 Dodge Shadow.

In the case of a motor vehicle, the VIN is coded by the manufacturer to reveal various features of the vehicle. For example, the first character represents country of origin, the second character represents vehicle type, the third represents the number of passengers, etc. A typical VIN for a 1990 Dodge Shadow in FIG. 2.

The number "1" indicates country of origin, the letter B indicates vehicle type, the number "3" indicates the number of passengers, the letter "X" indicates the type of restraint system, etc. The data base of the present invention contains storage locations corresponding to each of the characters and stores each of the characters in the appropriate storage location. For example, in the case of the 17 character VIN, the data base has 17 storage locations; one for the model year, one for country of origin, etc., plus an additional number of storage location(s) for security and expansion purposes. The computer then accesses the predetermined storage locations to assign a title number and registration number both of which are identical to the VIN and are coded to reveal certain information about the article. The computer then assigns a shortened registration number that is a coded version of the title number/VIN. For example, in the case of the motor vehicle, the computer might access the storage locations storing the characters corresponding to the vehicle type, model identification, model year, and the six digit identification number. The resulting shortened registration number could be up to 9 characters, comprised of three alpha numeric symbols which identify vehicle type, model identification, and model year; and six digits which identify the particular item.

The shortened registration number will typically be comprised of three letters which correspond to certain characters of the VIN, and six digits which correspond to the last six digits of the VIN. In a typical example, the first three letters of the registration number indicate vehicle type, car manufacturer model, and model year of the vehicle. The six digits at the end of the title identify the particular vehicle. In the Dodge Shadow example above, the computer would assign a registration number of BPL-196504. It will be understood, however, that the registration number may be coded to represent different information represented in the VIN, depending upon the desired application.

Figure 3:
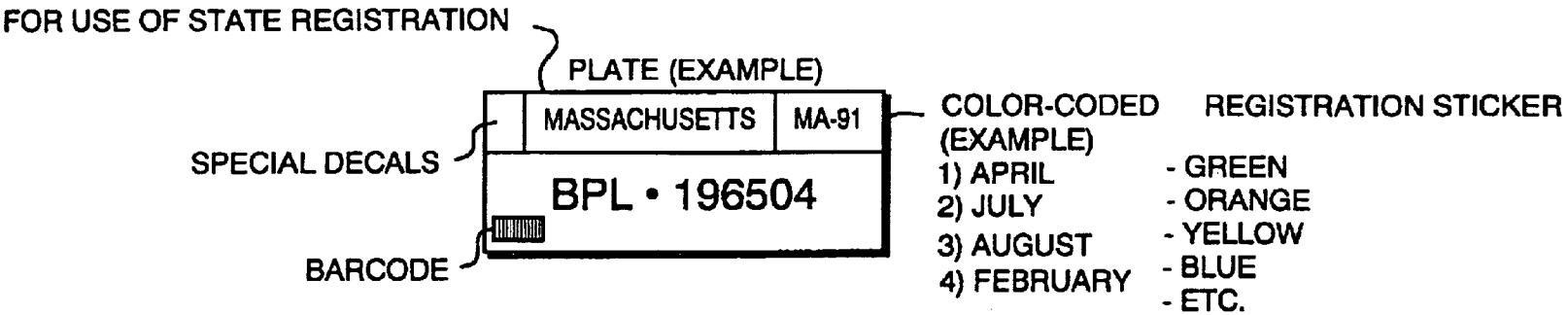
FIG. 3 shows a typical license plate.

A typical license plate is shown in FIG. 3. In addition to the registration number BPL 196504, the license plate shows the state (Massachusetts in the example), a color coded registration sticker (MA-91), a bar code VIN/title number and a space for special decals. It will be understood that the bar code may be replaced with a hologram. Since the license plate contains the shortened version of the registration number, the first three letters of which corresponds directly (in this example) to the 2nd, 5th and 10th characters of the VIN, the license plate provides an immediate indication of the vehicle type, car model, and year. If the system were used for items other than motor vehicles, or other types of license plates, the graphics device would print tags or some other device showing registration number/title number which could be affixed to the articles.

By tying the VIN, th title and registration numbers together, the system makes false titles easy to recognize because false titles would not contain the accurate data about a particular vehicle, thereby eliminating the ability to "wash" a vehicle or the sub-parts of a vehicle through a different jurisdiction by "creating" a new title, as is currently practiced. If the title were to become lost, the dealer could simply present the VIN to the master title company and the title could be tracked on the centralized computer data base. This eliminates the need for issuing new titles when an original title is lost, and therefore prevents the "washing" of titles. It also eliminates the need to make license plates more than once. It will also eliminate the motivation to steal license plates and/or alter VINs.

The title history file has storage locations for at least the following: A copy of the MCO (manufacturer's certificate of origin) on new vehicles; current owner information, previously owner information including odometer readings and purchase prices, accidents and major repairs, salvage information and rebuilding information. Photo-imaging files, information on the new owner, including name and address, social security number or corporate federal identification number, the purchase price of the vehicle, and the dealer's name are transmitted to the computer data bases, along with any other pertinent information such as the insurance company, the lienholder, the dealer, the major recorded parts of the vehicle, etc.

If the title has been lost, the VIN may be transmitted in place of the title number because the two numbers are exactly interchangeable. This is a major improvement over the current systems where the VIN number, title number, and registration number have no correlation to each other.

To control the insurability of vehicles, the registration is printed by the insurance company or other authorized agent (s) of the DMV or title company once it receives authorization from the title company or authorized entity. The form is substantially similar to the existing tags of plates, but would not be issued to untitled and uninsured vehicles. This would greatly enhance the bottom line costs for the general public because according to insurance company and DMV statistics, of the approximate 191 million known motor vehicles (1991 statistics) registered in the United States, a staggering 25 percent travel with no insurance whatsoever. The cost burden is borne by the other 75 percent of motor vehicle owners.

A title insurance company can then issue a title insurance policy for the vehicle, insuring against title defects, and perhaps charged as a pass through at loan closings on every vehicle by the bank. It also could provide re-insurance to insure against no insurance and/or stolen and resold vehicles and/or salvage vehicles with defective titles. In addition to authorizing the insurance agent or dealer to insure the title, the master title company verifies the legal existence of the title to the insurer, the DMV, the owner and if the vehicle is financed, to the lender.

If the insurance agent and/or dealer is the responsible party for printing the title identification cards they may do so after they receive authorization from the tilt-insurance company or DMV certifying the title, in the case of a new title, or title updates. It also certifies the insurance and the registration. When the vehicle is sold to a third party, the printed title registration cards are returned to the insurance company in lieu of the registration plate(s) so that the policy may be canceled and the new owner information may be added to the title data base. Once the title data base is updated, newly printed title registration cards or typical automatic teller machine (ATM) type cards are issued to the new owner with evidence of insurance. When the vehicle is sold, the "title/registration" identification card(s) are returned to cancel insurance and update the title (instead of the plates). The plates stay with the vehicle. A new identification card and state registration sticker(s) are then put on the permanent license plates.

If the vehicle is damaged in an accident or stolen, the owner would report the damage or loss to the insurance company. In addition to processing the claim, the insurance company documents the accident by data and photo-image input into the central computer data base.

The DMV acts as a check against the title company and verifies all of the title information, and sends any accident and theft information to the title company as required by law as it may vary from state or country to country.

Upon payment of appropriate fees to the DMV or their authorized agent, the owner of the vehicle receives the verified title and the ATM style identification card(s). The bank or finance company and the vehicle warranty insurance company receive a copy of the title and title insurance policy where applicable.

To initiate the program into a state, all vehicle owners would be required to submit a certified copy of their registration and their title (if it is free and clear) to the insurance agent. If the title is not free and clear, the owner is required to submit the name of the lienholder, who will forward a copy of the title (usually by facsimile) to the insurance agent/title company.

Upon receipt of these documents, and verification of same the master title entity issues a new and permanent license plate for the vehicle with bar-coded title number attached. The new license plate then shows registration numbers coded to the VIN number, or in the alternative, issues vanity or regular/special plates with the bar-coded title number attached.

The title must be updated with every change of ownership or once per year or otherwise, as may be required from state to state, with every re-registration if the owner is the same. It is anticipated that all re-registrations could be done by mail as current methods call for with the appropriate adjustments to accommodate this new process. The owner pays the DMV or its authorized agent a fee to obtain the annual re-registration stamp which is proof that the registration has been paid. A distinguishing feature of this new style is that the new title form showing the title number, plate number and owner's identification number (VIN number) must be filled in by the owner of the vehicle. Before the stamp is given, the information is cross-checked to insure that the evidence of ownership, insurance, etc. is correct.

The cycle registration may be put into effect on any periodic basis during the year, leaving owners a certain period each year in which to re-register the vehicle and prove ownership, title and the re-insurance of the vehicle; pay excise taxes, etc. This may be altered depending upon each state's method of doing business. The system may be adapted to provide a means for verifying that all tax and registry fees paid to the authorized agent are, in fact, transferred to the appropriate government entity.

Figure 1A:
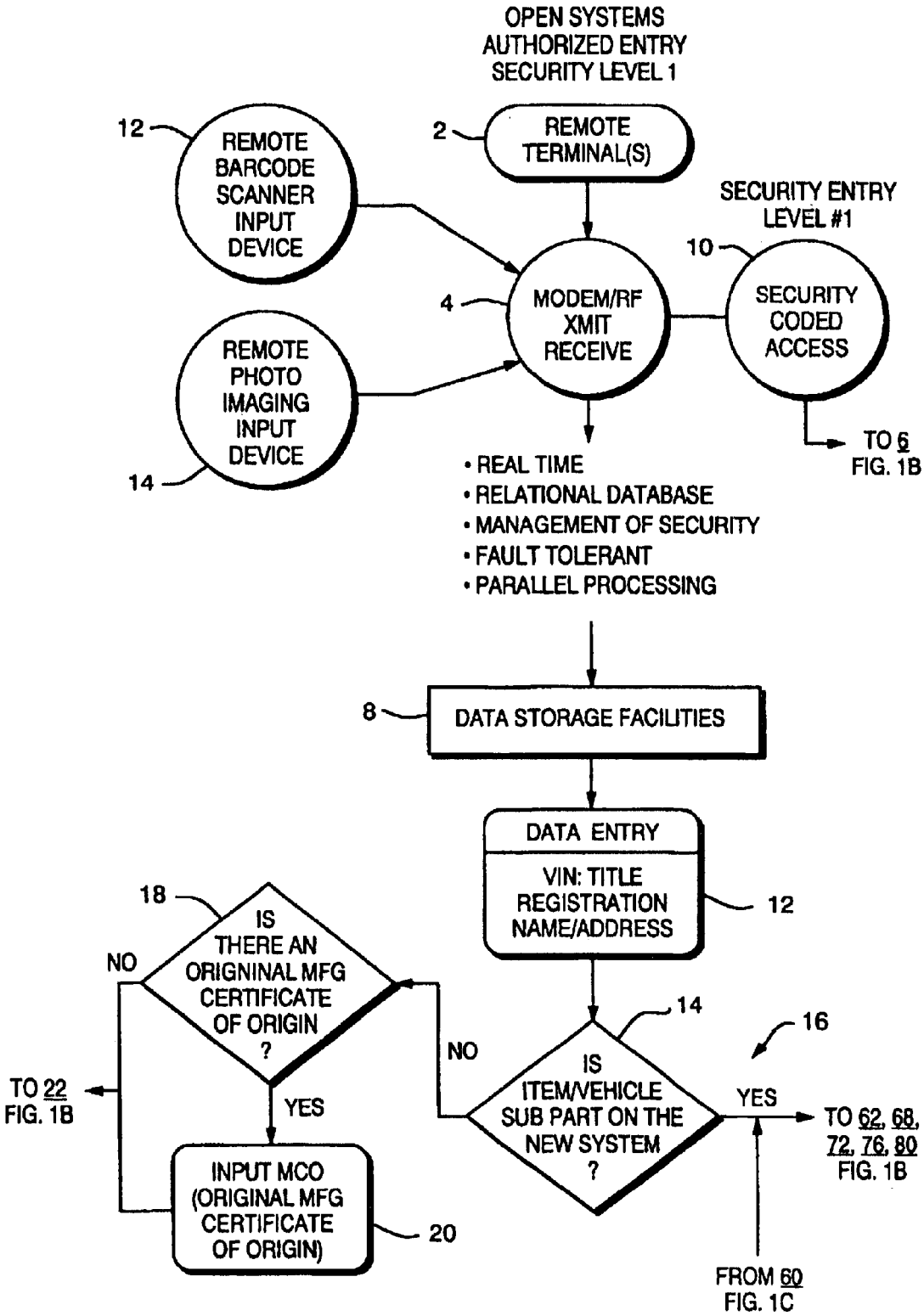
FIGS. 1A–1H show a flow chart of the preferred embodiment of the system.

FIGS. 1A–1H show a flow chart of the system for handling transactions relating to motor vehicles. The computer is an open system environment and can communicate with any other computer system. To access the computer, the authorized users (i.e., auto dealers, salvage dealers, insurance agents, and the DMV) have an authorized entry code which is transmitted from a remote terminal 2 via a modem or RF device 4 to the data storage facilities 8, as shown in FIG. 1A. This is done in real time, with a relational data base with a high degree of security, fault tolerance and parallel processing. External data base entities 6 (i.e., DMV, insurance companies, R.L. Polk Co., salvage recyclers, court systems, state and local revenue systems, banks, finance companies, state and local police, vehicle repair, National Auto Theft Bureau etc.) also have security coded access 10 to the data storage facilities 8. Additional security may also provided in the form of remote bar code scanner input devices 12 and remote photo imaging input devices 14. This security means cam easily be accomplished using known technology, including that disclosed in U.S. Pat. No. 4,879,747 to Leighton et al.

To begin, the VIN is transmitted to the data base 12. Any other relevant data may also be input at this stage. For example, if available, the registration number, title number, and data on the owner may be input, (i.e., name and address, social security number or federal identification number (FID)).

The computer scans the data base to determine whether the vehicle is already on the data base 14. If so, the computer accesses a decision tree 16, discussed in detail below.

Figure 1B:
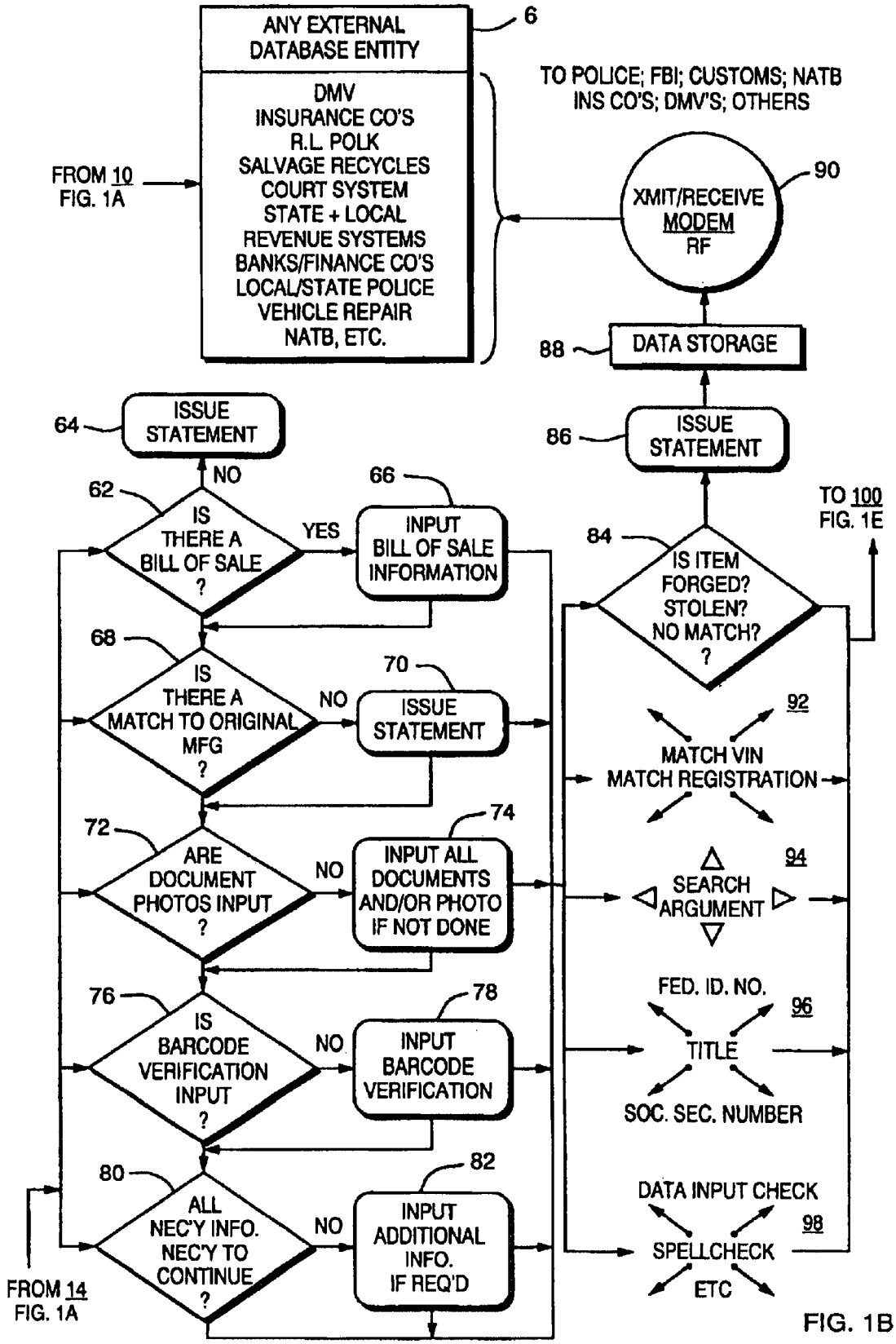

But if the vehicle is not on the system, the computer checks to see whether there is a manufacturer's certificate of origin (MCO) 18. If so, it is input into the computer 20. The computer then determines whether there is an existing title number to the vehicle 22, as shown in FIG. 1B. If so, it accesses the old title number 24 and assigns the vehicle a new title number identical to the VIN 26. The computer then performs a data control check 28. Next, the computer determines whether there is an existing registration number 30. If not, a statement is issued 32. If so, it asks whether the plates are with the vehicles 34. If not, a statement issued 36. If so, it asks whether the VIN has either been altered or is missing and whether it matches the MCO 38. If there is a problem, a statement is issued 40. When those statements are issued, the computer transmits the information via modern or RF device 42 to the host computer at the DMV 44 for verification. Assuming no such statements are required, however, the computer deciphers the VIN into its code 46 and then stores the information in appropriate storage locations 48 so that each storage location reveals particular information about the vehicle (i.e., the typical VIN). After sorting the information, it transmits a signal to a printer to print a copy of the MCO verification of the item description 50. At a data control search argument 52, the computer compares the MCO description with the data revealed by the VIN. Next the computer assigns a registration number, identical to the title and VIN, and a shortened registration number based on certain characters of the VIN/title number 54.

After the shortened registration number is assigned, the computer checks to see if there is any duplication of the shortened registration numbers on the data base 56. If so, the computer issues a statement 58 and re-deciphers the VIN code as a double check 46. If no identical shortened registration number is found, the program inputs the new title information 60 and proceeds to decision tree 16 shown in FIG. 1A.

As mentioned above, decision tree 16 is accessed when the vehicle is already on the system. This program begins with a determination as to whether there was a bill of sale involved in the transaction 62. If there was no bill of sale, it issues a statement to that effect 64. If there was a bill of sale, the computer requests that the bill of sale information be input to the computer 66. The bill of sale information includes all relevant information such as the date of sale, new owner's name, purchase price, place of sale, mileage at time of sale, and any other information considered to be relevant.

After the bill of sale has been entered, the computer asks whether there is a match to the original MCO 68. If there is not a match, a statement is issued 70, and the appropriate action is taken. Next, the computer asks whether all relevant documents and/or photo-image records have been input 72. If not, they are input at this stage 74. Next, the computer asks whether bar code verification has been input 76. If not, it should be input at this stage 78. Next, the computer asks whether all data has been input which is necessary to container 80. If not, it is entered at this stage 82.

The computer then scans a list of all stolen vehicles which have been previously entered on the data base by the appropriate authorities, to determine whether the entered vehicle is stolen 84. If a problem is found, a statement is issued 86 and the information is sent to the data storage 88 and then transmitted via computer modem or RF device 90 to the appropriate authorities at one of the external data bases 6.

It also checks to see whether the VIN number and registration numbers correspond to one another as required, and that the data matches the data on the MCO 92. The computer then performs a data control search argument function to ensure that the VIN, registration number, title number, FID or social security number and MCO have all been properly entered 94, 96, 98. For example, the VIN is a 17 digit number. If fewer than that many digits have been entered, an error signal will issue.

Figure 1C:
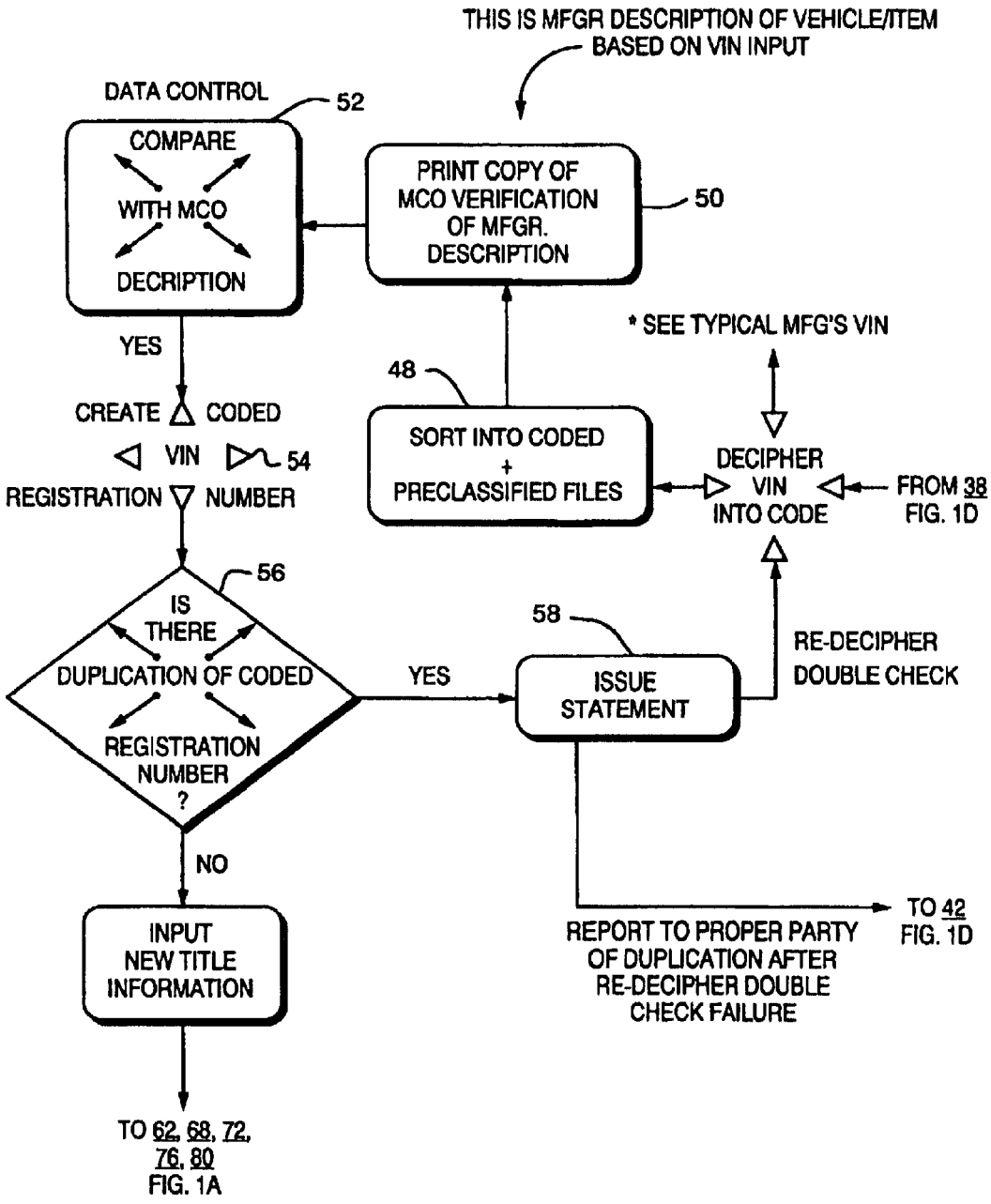

Assuming no such problem exists, the computer accesses the existing title history 100, as shown in FIG. 1C. It then determines the nature of the transaction at hand by asking the following series of questions: whether the purchase is new 102, i.e., the sale of a brand new vehicle; whether it is a sale of a used vehicle 104; wherein it is an update to an existing registration 106; and whether there has been an accident 108.

If it is a new purchase, the new owner information is input 110. If it is a sale of a used vehicle, the "current owner" is converted to the prior owner 112 and the new owner's name and address and other appropriate information are entered 114. In the case where the transactions is merely an update to an existing registration, the new data is input 115. This may be new data such as a change of address or change of insurance company.

Figure 1D:
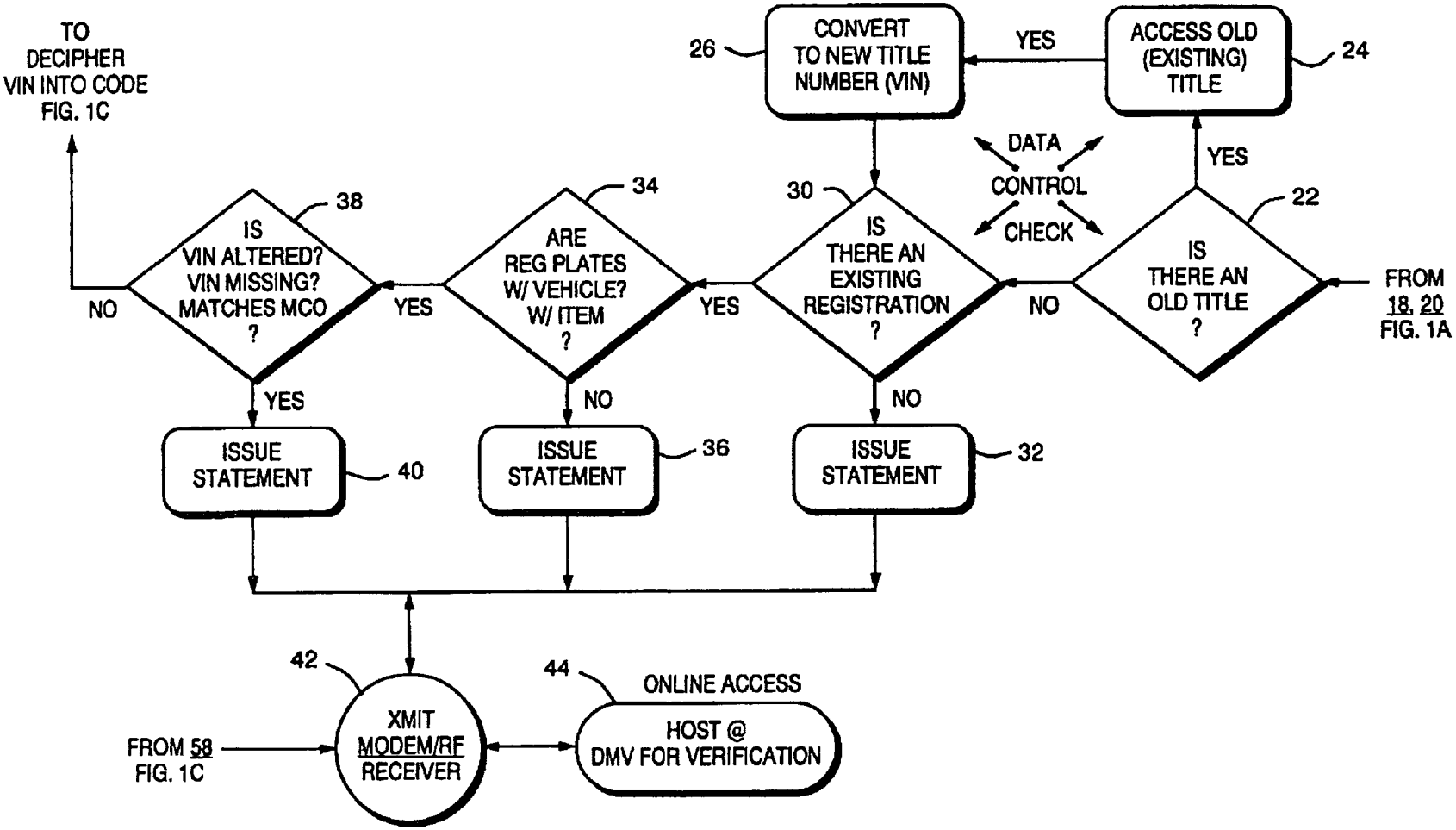

In the case of an accident 108, all available information on the accident is input into the computer 116, including photo-images and/or information on replacement parts. The computer asks whether the accident photograph has been input 118. If it has not, it is input 120. Next, the computer asks if insurance claim information has been input 122. If not, the relevant data is input 124. Next, the computer inputs photo-image documents 126 and replacement parts information 128. Next the computer checks to see whether the vehicle is a salvage item 130, as shown in FIG. 1D. If so, it is referred to the subroutine shown in FIG. 1F, which will be discussed in detail below.

If the vehicle is not salvage, however, the computer asks if the vehicle is being re-issued 134. If it is being re-insured, it asks whether the vehicle has been re-inspected 138. Appropriate statements are issued when either of those questions are answered in the negative 136, 140. Next, it asks whether all documents have been input via the photo-image where applicable 142 and inputs those documents where required 144. The program then proceeds to the subroutine shown in FIG. 1E where it asks a series of questions relating to fees and other matters. It will be understood that the insurance information, registration fee information, lien information, and tax information may be transmitted to the centralized data base by each of the agents responsible for handling those matters.

First, it asks whether the transaction took place in a state in which automobile insurance is required 146. If not, a statement is issued 148. Next, it checks to see whether previous insurance has been paid 150 and whether current insurance has been paid 152. If either of those questions are answered in the negative, the computer issues a statement 154, 156 and requires those fees to be collected and deposited in a secured account 158, 160. Next the computer asks whether all of the proper registration fees have been paid 162. If not, a statement is issued 164 and the computer requires verification that such fees have been collected and deposited in a secured account 166. The computer then requests verification that all forms required by the DMV are complete (for example, the RMV-1 form is required in Massachusetts) 168. If not, they are completed and input 170. At this stage, the computer performs a data integrity check 172.

Next, the computer asks whether this is a transaction in which financing is required 174. If so, it issues a statement 176 and requires verification that fees have been collected 178.

The computer then checks to see whether any finance liens are open 180. If so, a statement is issued 182 and the funds are collected and deposited in a second account 184. Next, it checks to see whether all relevant taxes have been paid 186. If not, a statement is issued 188 and the funds are collected and deposited into a second account 190. It then checks to see whether the vehicle has been inspected by the Department of Motor Vehicles (DMV) and/or the insurance company 200 and issues a statement if it has not 202. If not, the computer issues appropriate statements.

Figure 1F:
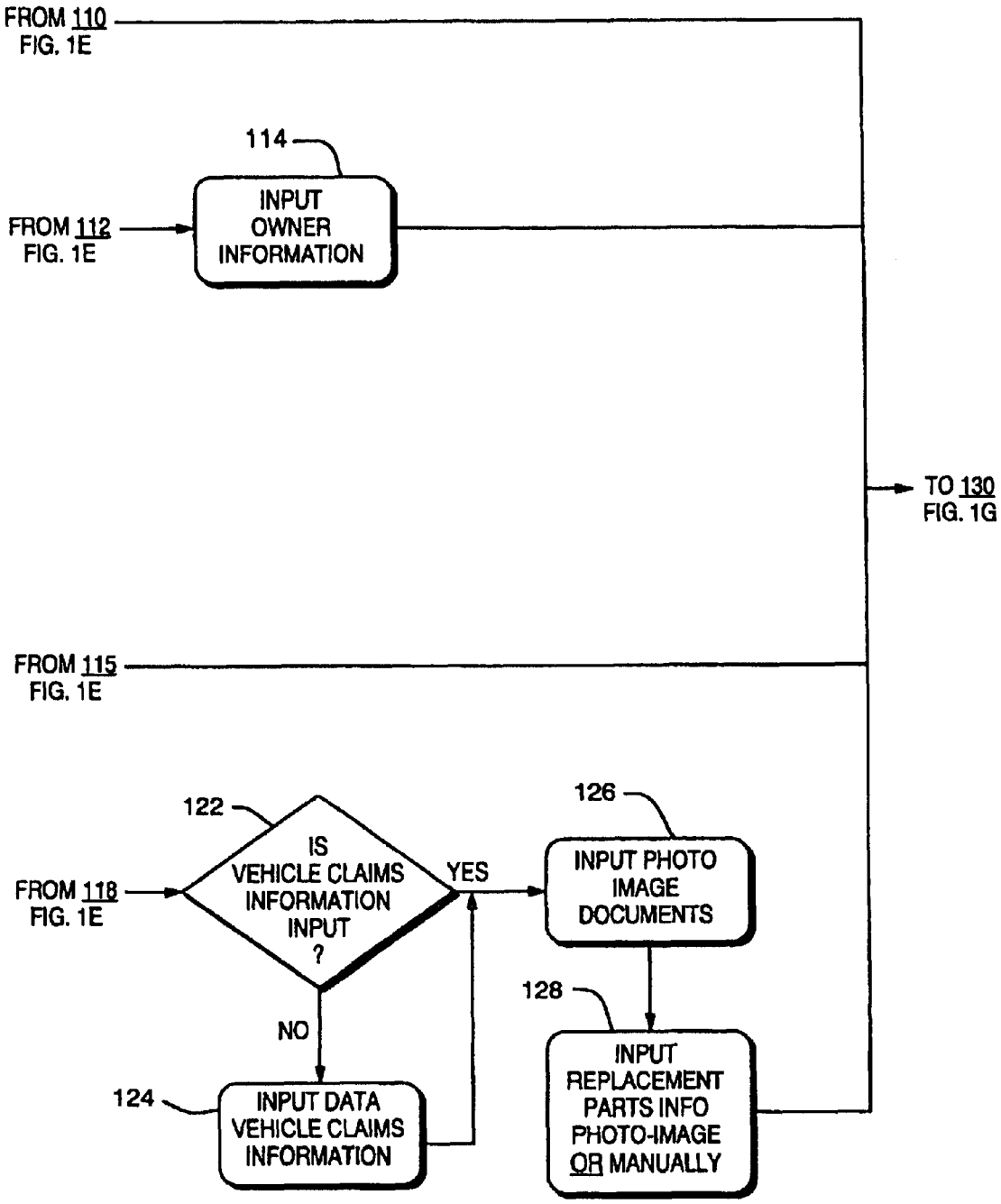
Figure 1G:
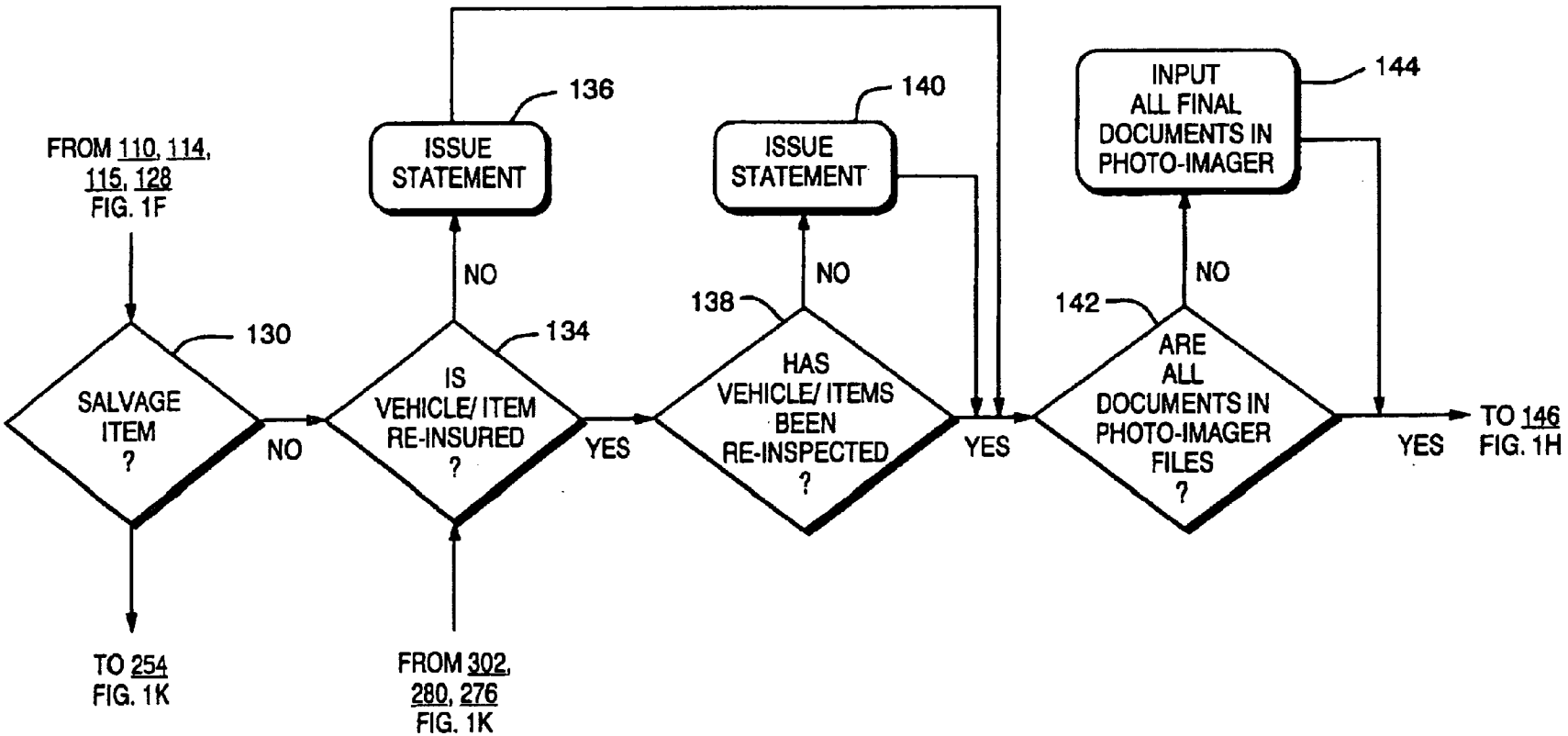

The program then proceeds to FIG. 1G and a check is made for appropriate validation of input 204. This is where the computer validates all of the existing data to make sure it is accurate. The invention may use the data check methods described below, using an electronic fingerprint or triangular data check, or it may use any of the known methods of conducting data checks, such as sequential matching.

The reduction of the existing four separate data base keys (VIN, title, registration I.D. number, owner) of the existing systems, to one-key (VIN=title=registration I.D. number) has its basis in mathematics and computer logic. The Boolean logic requirements for bit by bit sorting becomes greatly simplified in search and match procedures and would greatly enhance the central data base capabilities to cross-match and verify data. This greatly reduces the logic requirements of the search program to a simple "and/or" logic sequence.

Further, by assigning a mathematical value (sin; cos; etc.) to ASC II decimal, binary, octal and hexadecimal modes during data input even faster recall and match-up of data is accomplished during and/or procedures.

It will be understood that this invention may use the assignment of mathematical values creating unique algorithmic means for sorting or pre-sorting data and verifying data, but is not limited to use of those means.

Figure 4:
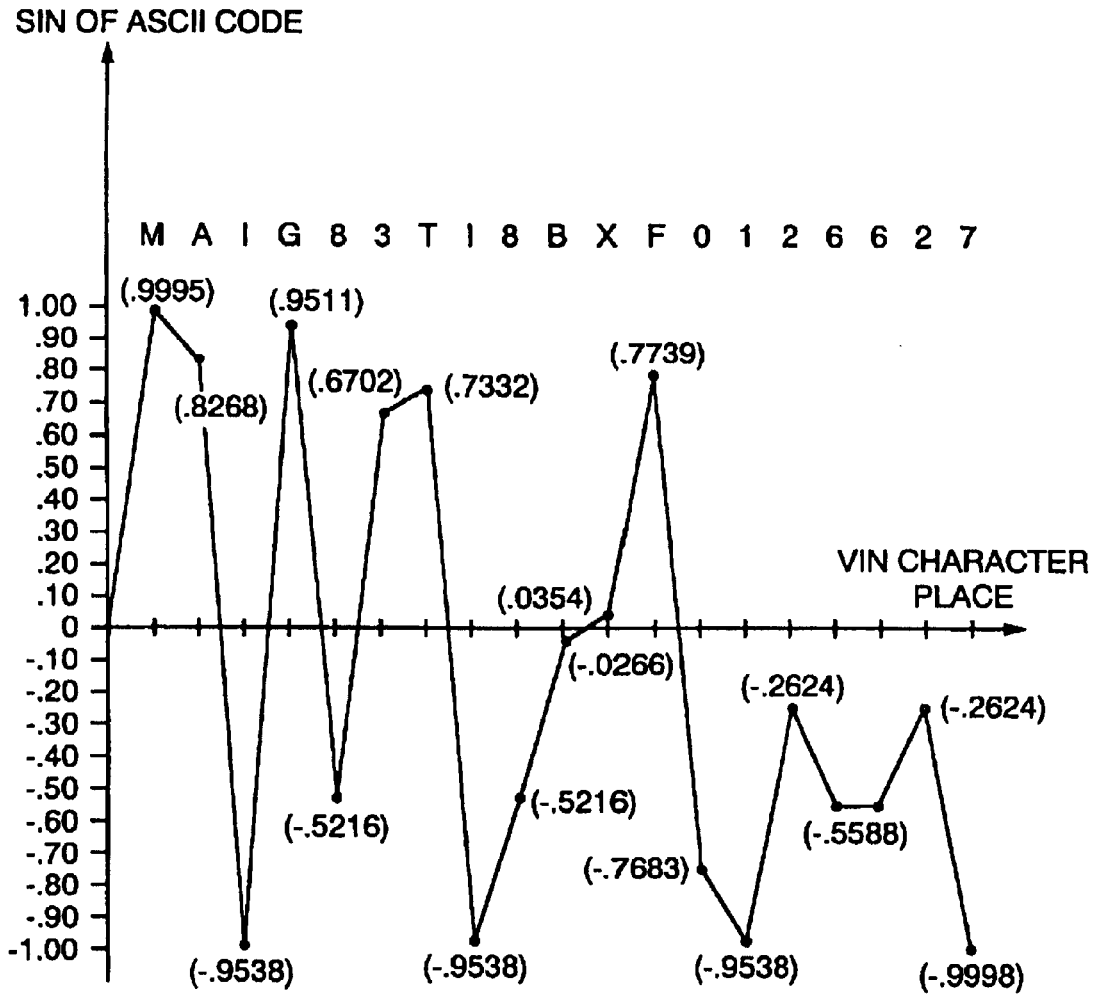
FIG. 4 is a graphic representation showing the sin of the ACS II values of a particular VIN.

Each alpha-numeric symbol has a unique corresponding ASC II value in electronic impulse. In one method, the computer assigns the ASC II code value for each alpha-numeric symbols of a partial VIN or other number, calculates the sin of the particular ASC II code value and then plots those values as shown in FIG. 4. In this manner, a graphic representation or "electronic fingerprints is created for each VIN, title, etc. which is used to compare the aggregate graph of data input, or to compare the on-file alpha-numeric "electronic fingerprint" as data is input key by key or in the aggregate on a computer keyboard or using light waves of varying frequencies to represent each ASC II value; or by using sound waves converted to electronic signals, radio waves, etc. A simple graphic representation of each symbol (in its proper order and sequence) is easily detected in order to correct errors of mismatch when updating or cross-matching files or used for bulk-information presorting when handling large volumes of data.

The graphs may be created using a two dimensional X, Y axis, or a three dimensional X, Y, Z graph. They can be converted into a holographic design. This system would relate to any waves of any frequency, including radio waves, light waves, sound waves, heat transfer, chemical reactions, neuro-chemical reactions, as an alternative, the formulation of ASC II values can simply be left as X=X for others than graphic match-up.

Figure 5:
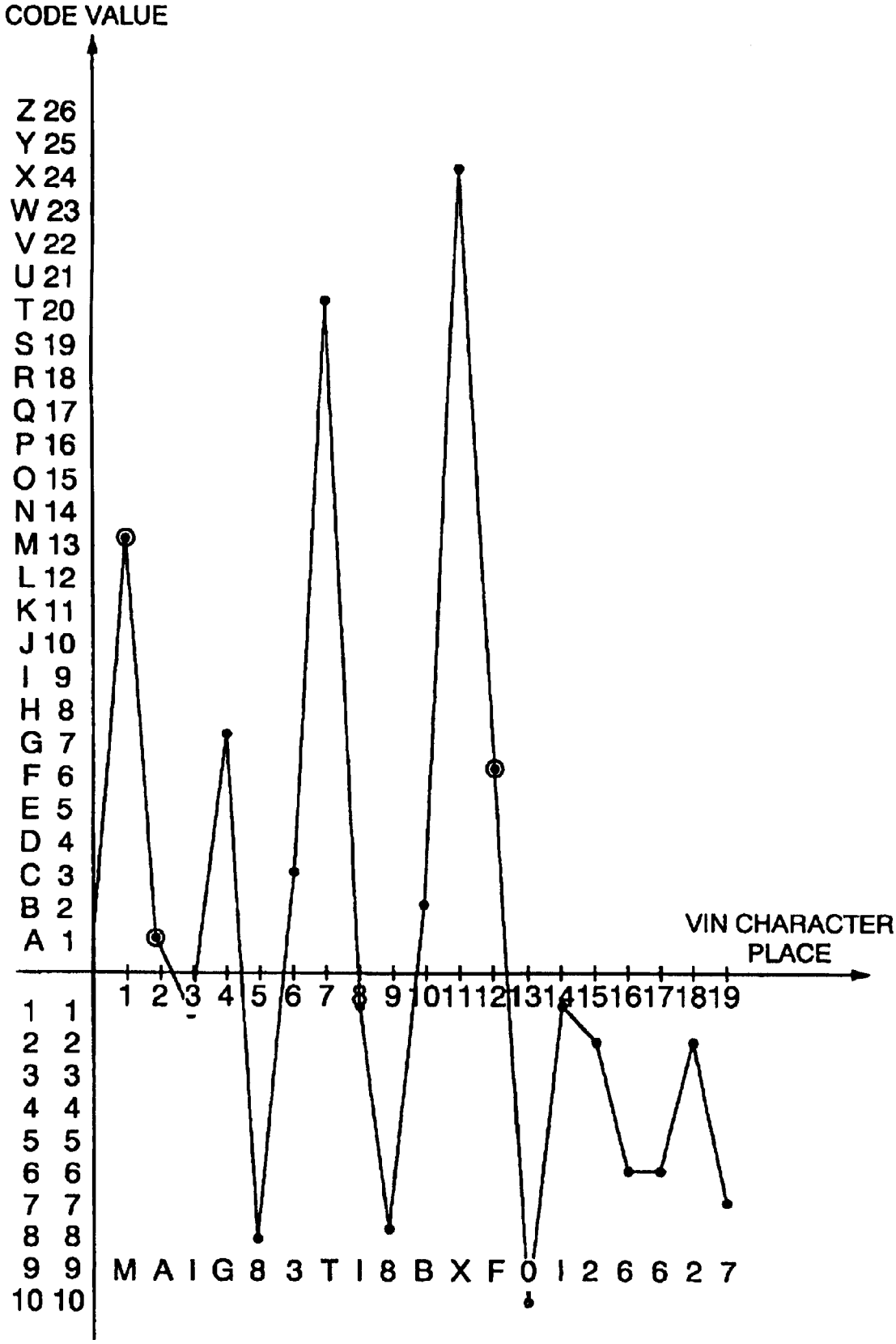
FIG. 5 shows an example of a VIN plotted on an x-y axis.

As a further alternative, the computer assigns a numeral value for each letter of the alphabets when A=1, B=2, C=3, or Z=26. Those values may be plotted, as shown in FIG. 5.

Figure 6:
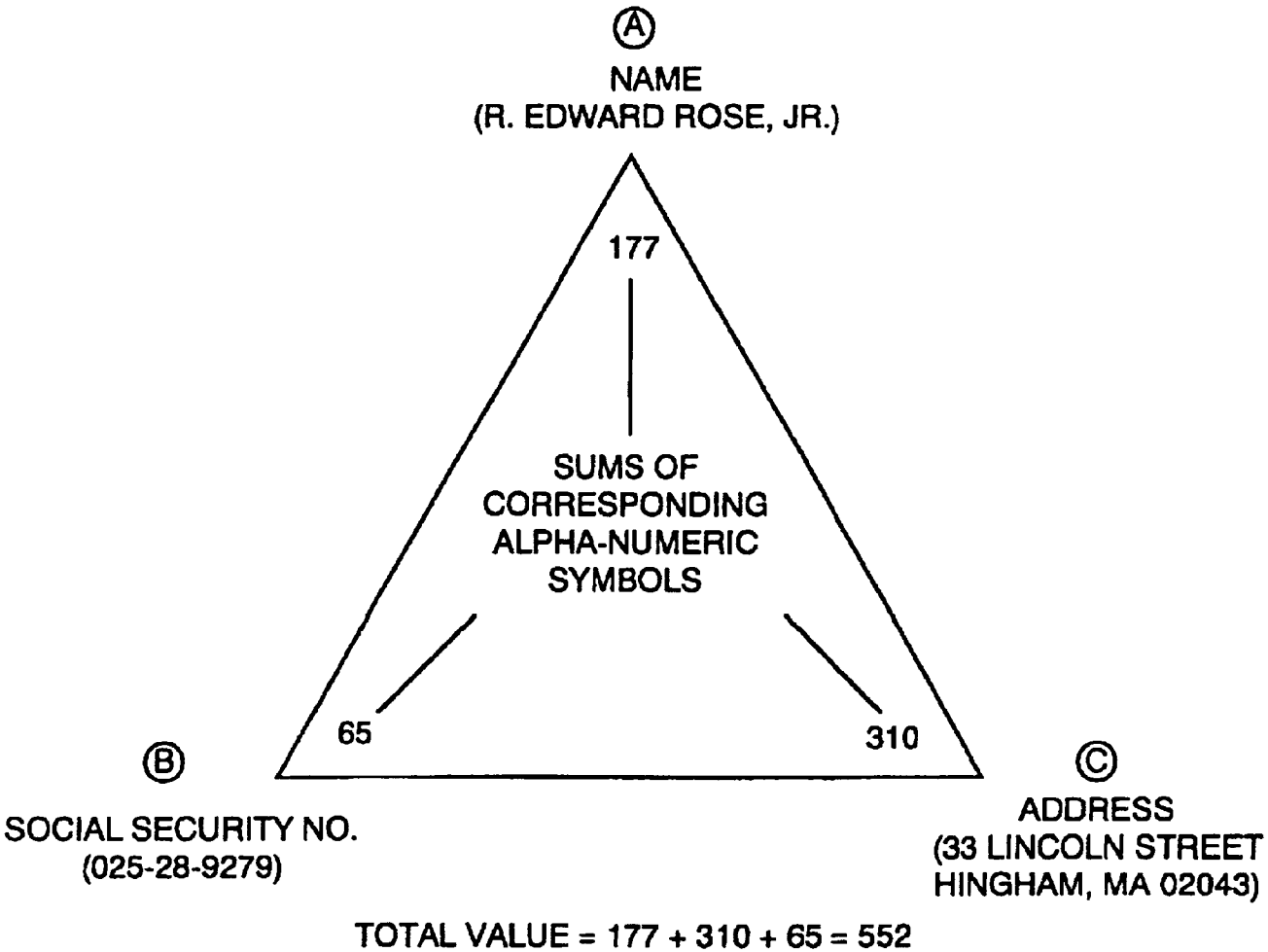
FIG. 6 shows a figure representing the triangulated data check of the present invention.

Once verification of authenticity of the asset and its current owner is made, a digital code is then given to the asset (and all of its pertinent information) so that, in a future search application a simple mathematical comparison of the unique digital coding of the alpha-numeric symbols of the VIN, the title and the registration tag numbers are taken from the system and automatically accepted or rejected by mathematical means. The new information is then automatically applied to the same title regardless of the owner or state/country residence of the asset. This eliminates the need to research old, disparate or incomplete records Finally, the invention contemplates in its simplest form the use of a triangulated data check in which the various data is input into the computer. For example, in FIG. 6, location A corresponds to name, B corresponds to social security number and C corresponds to the address. The computer assigns corresponding ASC II values and places them in the appropriate locations. For example, FIG. 6 shows a triangulated data check for R. Edward Rose, Jr. having an address of 33 Lincoln Street, Hingham Mass. 02043 and a social security number of 025-28-9279. The value of the name is 177 and is shown at A, the value of the social security number is 65 and is shown in B, and the value corresponding to the address is 310 and is shown at location C. Therefore, that individual has a total triangulated data value of 552. If the computer were to enter an incorrect social security number, the computer would assign a value other than 65, which would lead to an error signal.

As a further alternative, this "triangular data check" contemplates using the law(s) of sines and cosines as ratios derived from the trigonometric functions to solve the values of all triangles. If each leg of a triangle using specific values derived from specific and individual data about a vehicle, boat, individual owner, etc. represented all three legs of a given triangle, then that resultant triangle has a unique value inherent to that particular owner; item, etc.

Finally, it is possible to assign the sin values of the ASC II code for the letters of a state, as shown in FIG. 8. For example, sin (MA)=sin (M)+sin (A)=0.1016. Some of these are positive values, and some negative. It is possible to compare the sin values for particular states to see whether they match according to positive/negative values and thereby automatically sort by mathematical means using unique values, rather than bit by bit by sequential analysis. This is of particular value when sorting for fifty-one (51) jurisdictions with approximately 200 million vehicles.

Returning now to the programs, of the data stored in an active data storage file 206, is transmitted to a computer modem or RF device 208 and finally is transmitted to the original host 210. The funds collected are transferred electronically to proper entities via modem or RF device 208. The issuance of the title is described in detail below with reference to subroutine shown in FIG. 1H.

Figure 1H:
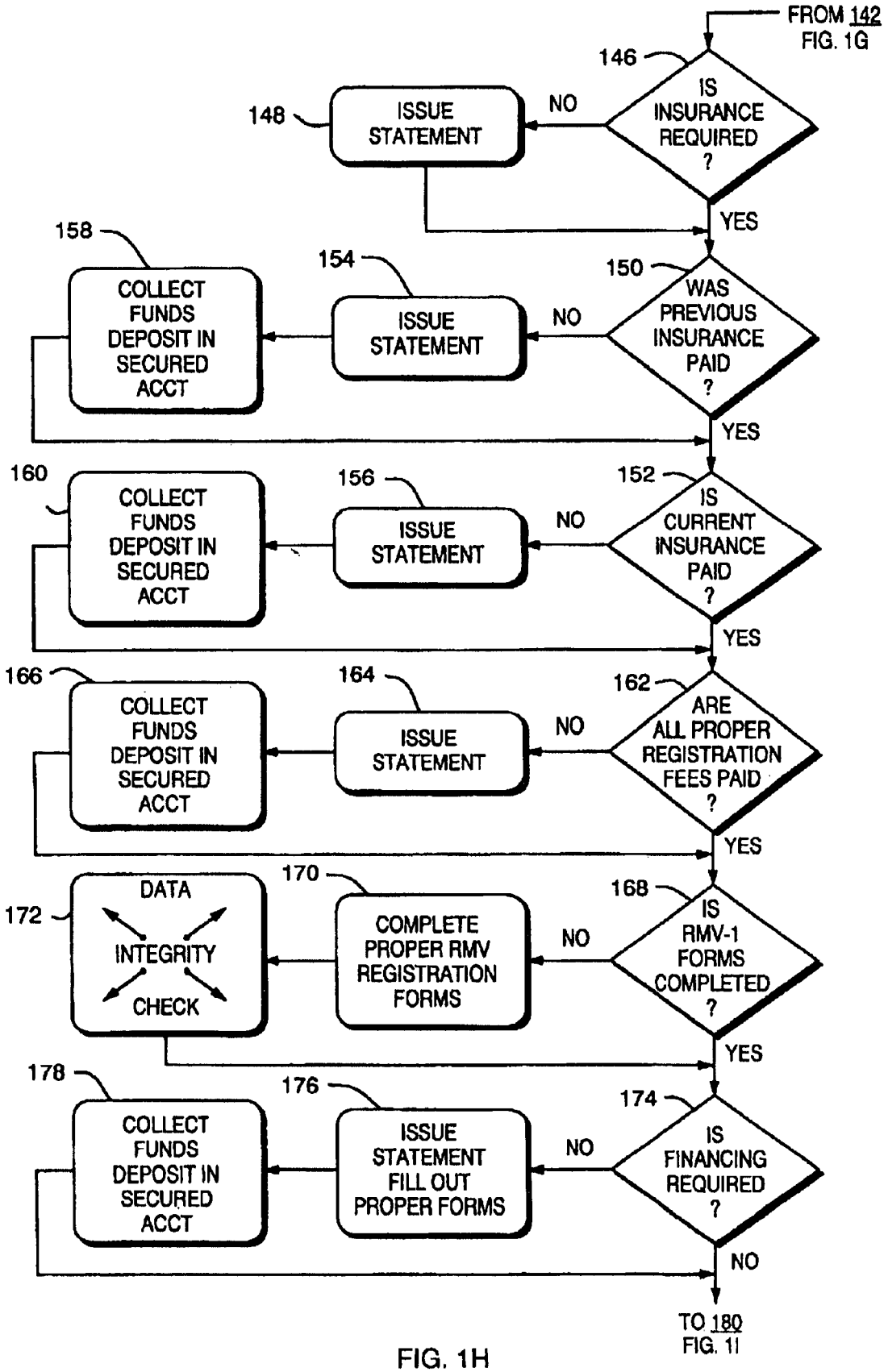
Figure 1I:
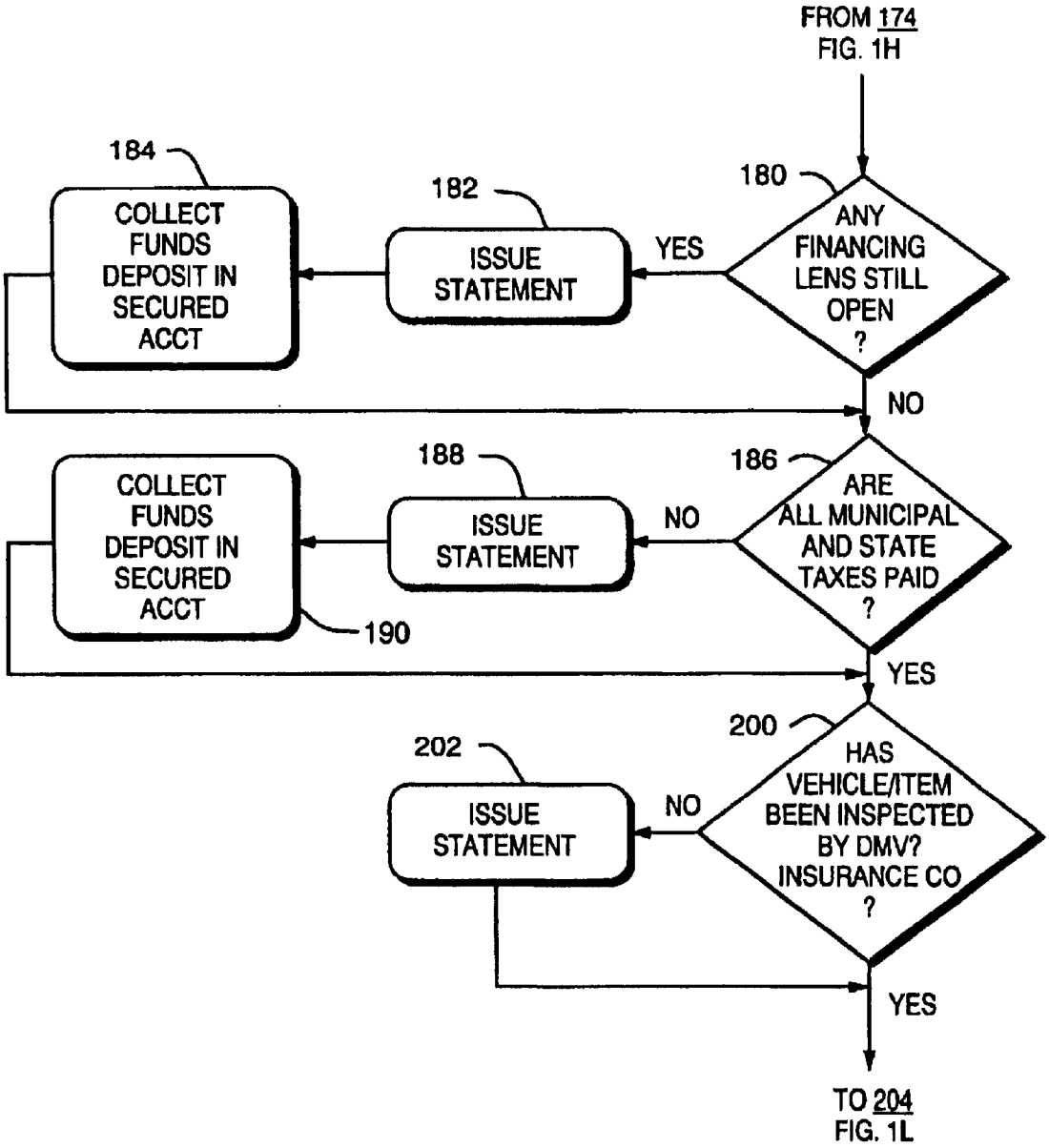
Figure 1J:
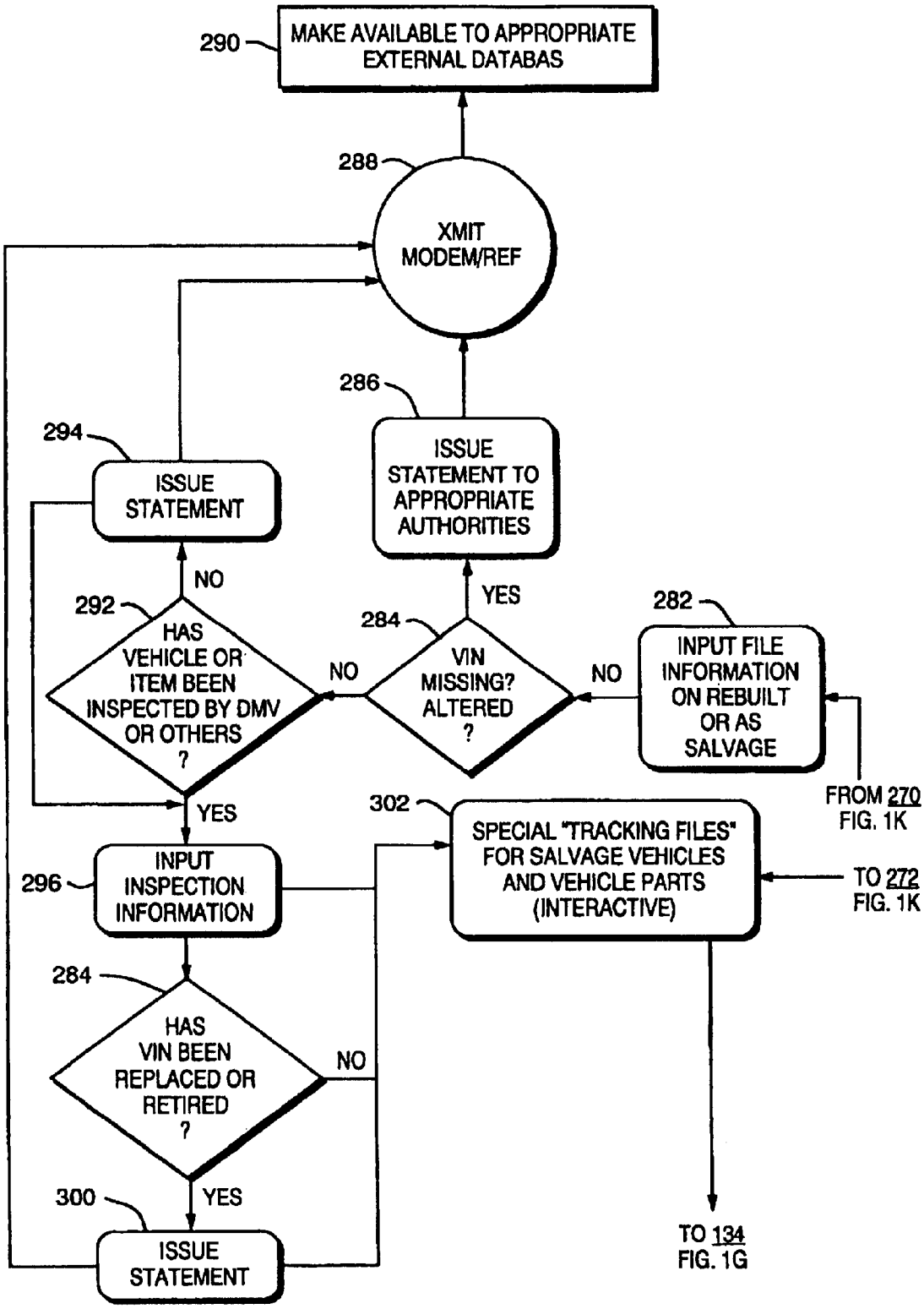
Figure 1K:
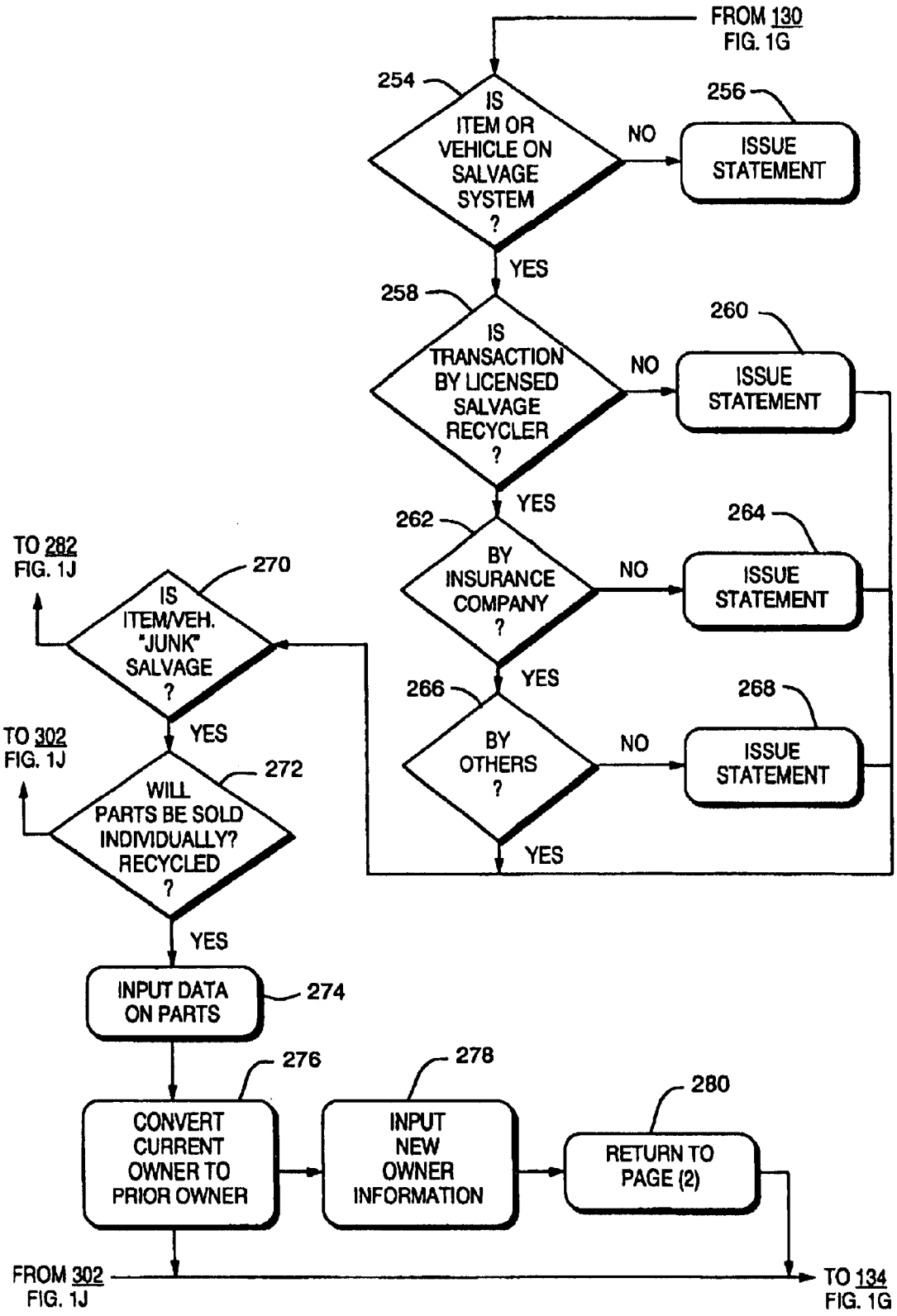
Figure 1L:
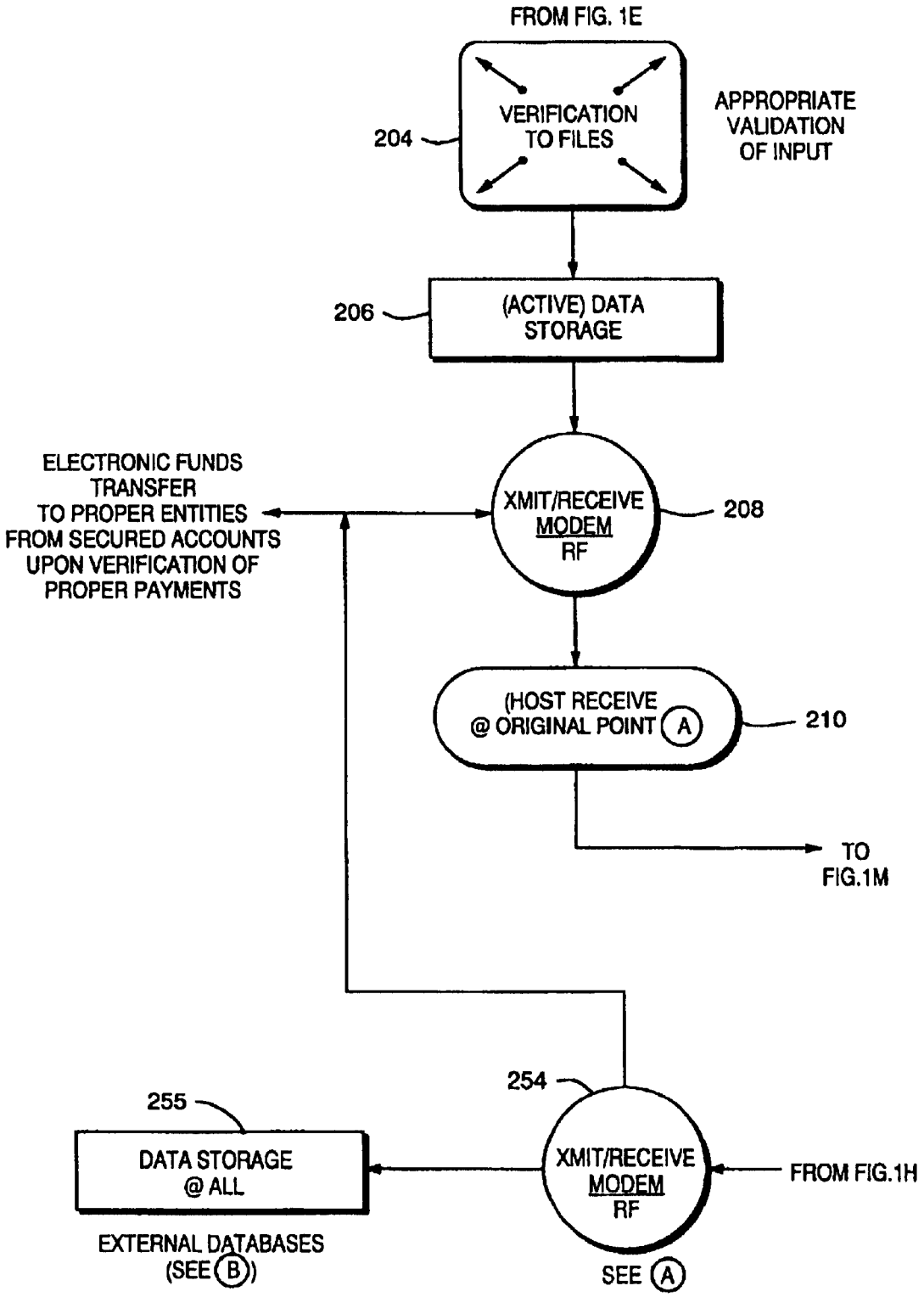
Figure 1M:
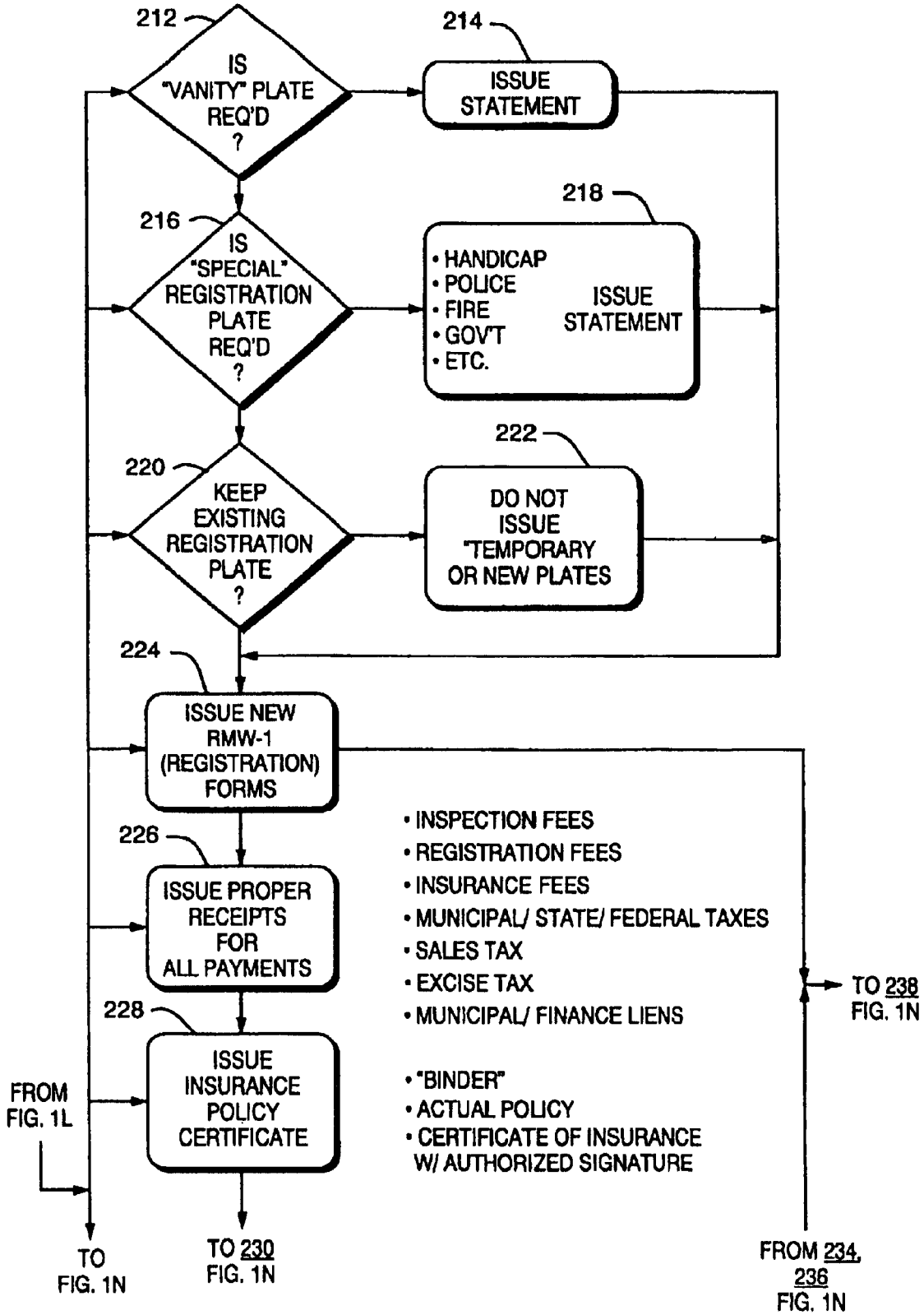
Figure 1N:
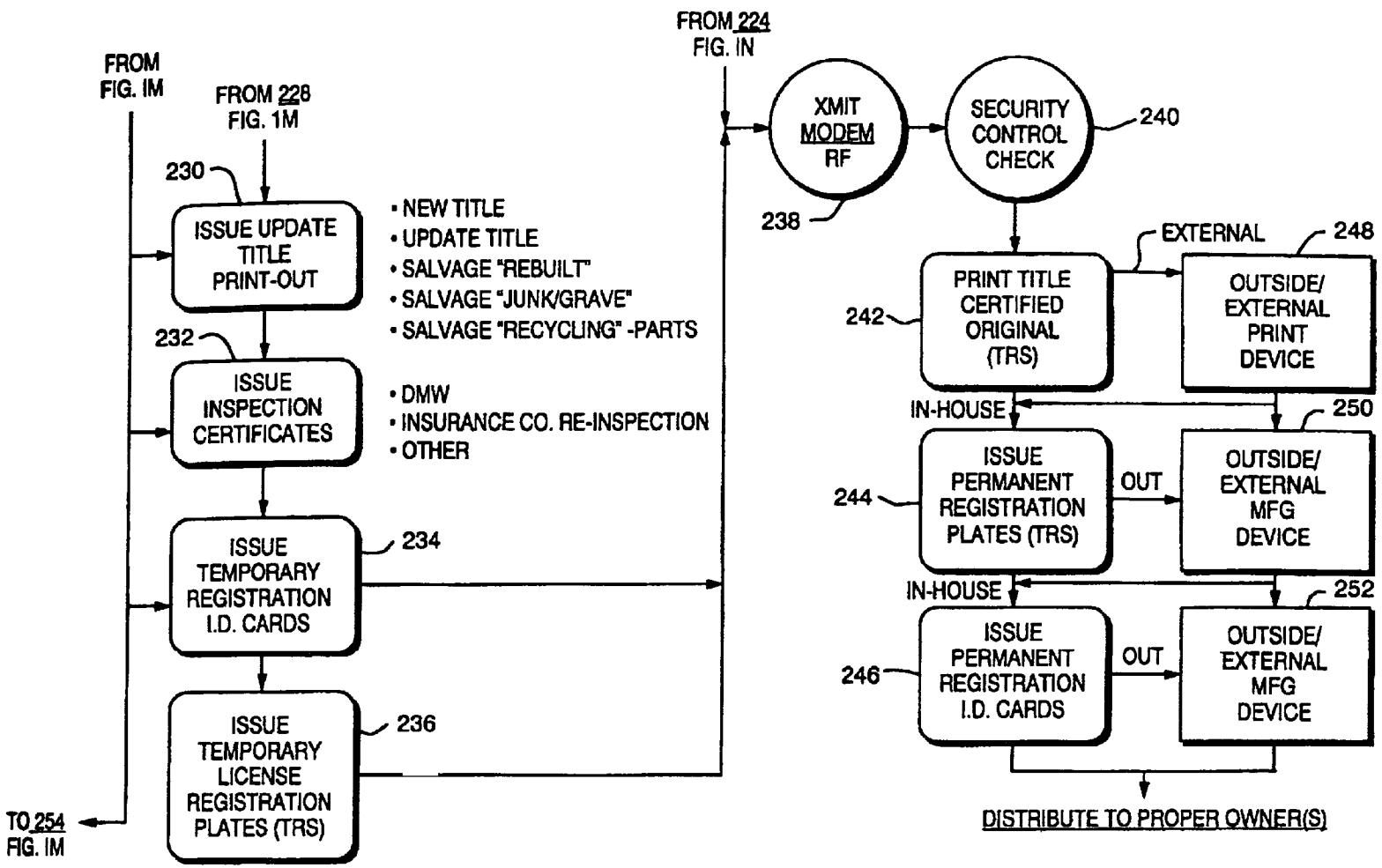

As shown in FIG. 1H, the computer asks whether a vanity plate is required 212. If so, a statement is issued 214. If not, the computer asks whether a special registration plate is required 216. If so, a statement is issued 218 (i.e., whether a handicapped, police, fire, government office, or other information is to be indicated on the registration plate). The computer then asks whether the existing registration plates are to be kept 220. If so, a statement is issued to not issue temporary license plates 222. If the existing plates are not to be kept, new DMV forms are issued 224, receipts are issued for all fee payments 226 (i.e., inspection, registration, insurance, municipal/state/federal taxes, sales taxes, excise taxes, and municipal/financing liens), an insurance policy certificate is issued 228 (the actual 37 "binder" policy), an updated title is printed 230 (including salvage, rebuilt, junk/grave and recycling information), inspection certificates are issued 232, temporary registration identification cards are issued 234 and temporary registration license plates are issued 236. Then the program returns to FIG. 1G where the funds are dispersed 254 electronically to all of the proper entities from the secured account. The information may be stored at the external data bases 225. Returning to FIG. 1H, the new title information is transmitted via computer modem or RF device 238, with a security control check 240 to print the original, certified title 242 using an external printing device 248. Permanent registration plates 244 and permanent registration identification cards are issued 246. The information may be transmitted to external manufacturing devices 250, 252 to print the plates and cards. All documents may then be distributed to the proper owners.

Returning now to the situation where the vehicle is a salvage item, FIG. 1F, the computer first checks to see whether the vehicle is already on the data base as being a salvage vehicle 254. It not, a statement is issued 256. Next, the computer determines whether the transaction is by a licensed salvage recycler 258, an insurance company 262, or by other 266. If not, appropriate statements are issued, 260, 264, 268.

The computer then asks whether the item is "junk" salvage 270. If so, it asks whether the parts will be sold and individually recycled 272. If so, the parts will be sold, data on the parts to be sold is input 274. At this stage, the current owner is converted to the prior owner 276, the new owner information is input 278 and the program returns to subrouting shown in FIG. 1D 280 at the point at which the program asks whether the vehicle is to be reinsured 134.

If the vehicle is not "junk" salvage, i.e., where the vehicle will be rebuilt, information on rebuilt or salvage is input 282. The computer then checks to see whether the VIN is missing or altered 284. If so, the computer issues a statement 286 and the appropriate authorities are notified via computer modem/RF device 288 to external data base 290. The computer may also check to see whether the registration plates are in existence. This requirement may vary from state to state.

If the VIN is in order and the registration plates are in existence (where required), the computer determines whether the vehicle has been inspected by the DMV or by any others where required 292. If not, it issues a statement 294 and the appropriate authorities are notified. If so, the inspection information is input 296. Next, it asks whether the VIN has been replaced or retired 298. If so, a statement is issued 300 and the authorities are notified. If the VIN has not been replaced, the data is sent to a tracking file for salvage vehicle 302, and the program returns to the subroutine in FIG. 1D at the point at which the program asks whether the vehicle is to be re-insured 134.

Turning now to the title registration cards ("I.D. cards") issued by the host (or third party) company, the front of the card could very easily show the name and address of the owner including a bar coded version or similar technology of title number and a "raised" or "embossed" version of the title number. The back of the card has a magnetic strip containing the encoded data similar to existing ATM or laser-reading technology corresponding to the title history maintained by the central data base, so that when the card is inserted into a reader, the complete title history appears on the computer screen. In addition to the title identification cards, an original paper title is issued, along with photocopies for the vehicle. The original is provided to either the lienholder or the owner, depending upon whether there was a secured lender involved. Copies of the registration/title identification cards may be supplied as the situation dictates to one or more of the following: the owner of the vehicle, the lender, the DMV, or the insurance agent. It may not be necessary to supply these permanent-type cards to anyone but the current owner of the vehicle, boat, etc.

Although the flow chart described above is directed to articles in which the serial number is assigned by a manufacturer, it is to be understood that it may be modified for use in tracking titles to valuable articles which are not already assigned a serial number by the manufacturer. These items typically include artwork and antiques. It will be understood that this system may be applied to any items of value which are not currently titled, but whose value may in some way be verified to the title company.

In order for the master title company to authorize a title to be issued, it requires proof of authenticity of the particular item be established. The system operates in essentially the same manner as described above, but instead of transmitting the serial number of the article, the authorized agent transmits relevant information on the item, such as the nature of the work (i.e painting, sculpture, antique furniture, etc.), date of origin, value, and a record of the verification of authenticity as well as detailed photographs. The data is sent to corresponding storage locations. The data base then draws upon all of the most important and/or the most readily identifiable codes to generate a title number. The title number may take the same form as the motor vehicle VIN number, title number and the registration number may have four letters and six digits. For example, the first four letters may indicate type of work, year of origin and author/artist and country of origin, and the remaining six digits may be unique to the particular item and serve solely to identify that particular item. When practical, the tags or other identification/registration plates would be issued to be affixed to the goods.

The host computer may also issue a single via modem or RF device that the title is good and authorize via modem or RF device a third party to print the title identification cards in much the same way as the first embodiment described above. Since the articles involved are valuable and would most likely be insured, the insurance agent may be authorized to issue the title. The data base may also be connected to art dealers and auction houses.

While the invention has been described in conjunction with specific embodiments thereof, it is evident that many alternatives, modifications and variations will be apparent to those skilled in the art in light of the foregoing description. Accordingly, it is intended to embrace all such modifications and variations as fall within the spirit and broad scope of the appended claims.

What is claimed is:

1. A *uniform* system for tracking titles to articles *or objects* having an identifying number*, tracking independently of preexisting tracking systems,* comprising:

(a) a centralized computer data base for storing data;

(b) means for transmitting a coded identifying number to said centralized computer data base;

(c) means for decoding said identifying number and storing characters of said identifying [numbers] *number* in predertermined storage locations *in the centralized computer data base* wherein each of said storage locations corresponds to a specific identifying feature of an article;

(d) means for creating a title history file responsive to transmission of said identifying number;

(e) means for creating a title number identical to said identifying number;

(f) means for creating a registration number identical to said identifying number;

(g) means for mathematically linking said identifying number, said title number and said registration number [to create a uniform system of tracking the article independent of preexisting tracking systems]; and (h) means for enabling uniform system users to retrieve data relating to the article.

2. A *uniform* system for tracking an article or object having a first identifying number*, tracking independently of preexisting tracking systems,* comprising:

(a) a centralized computer data base for storing data;

(b) means for transmitting a coded identifying number to said centralized computer data base;

(c) means for decoding said coded first identifying number and storing the results in predetermined storage locations wherein each of said storage locations corresponds to a specific identifying feature of an article or object;

(d) means for creating a history file responsive to transmission of said first identifying number;

(e) means for creating a second identifying number related to said first identifying number;

(f) means for creating a third identifying number related to said first identifying number;

(g) means for mathematically linking said first, second [or] and third identifying numbers, or any combination of said identifying numbers, [to create a uniform system for tracking the history of an article or object independent of preexisting tracking systems said] *the* uniform system further having means for accepting and updating data relating to the article or object;

(h) means for providing said uniform system to a plurality of users, having means for enabling said users to input data relating to the article or object, and means for instantly receiving updated data relating to the article or object; *and,*

(i) means for accepting alpha-numeric symbols[, said alpha-numeric symbols being]*of the coded first identifying number* generated externally from said uniform system.

3. The *uniform* system of claim 2 further comprising means responsive to the creation of said second identifying number for creating an encoded second identifying number comprised of certain alpha-numeric characters of said second identifying number corresponding to preselected storage locations so that said encoded second identifying number directly corresponds to said first, second and third identifying numbers, or any combination of said identifying numbers, wherein said encoded second number reveals information about the article or object, and may be applied directly to the article or object for easy identification.

4. The *uniform* system of claim 3 further comprising means for verifying that no duplicate numerations of at least said first, second and third identifying numbers exist.

5. The *uniform* system of claim 4 further comprising means responsive to said verification that no duplicate second identifying number exists, for transmitting a signal to a device for cutting, imprinting or attaching the encoded second identifying number on an identification medium for the article or object.

6. The *uniform* system of claim 3 further comprising means for transmitting information regarding replacement or maintenance of subparts of the article or object to said centralized data base and means for storing said information in said history file, so that when said history file is accessed, it will reveal such information.

7. The *uniform* system of claim 2 further comprising means for verifying that no duplicate numbers of at least said first, second and third identifying numbers exist.

8. The *uniform* system of claim 7 further comprising means for determining that all relevant fees and information have been accounted for.

9. The *uniform* system of claim 8 further comprising means *for issuing a second identifying number to said article or object* responsive to verification that no duplicate numerations exist and that all relevant fees and information have been accounted for[, before issuing a second identifying number to said article or object].

10. The *uniform* system of claim 8 further comprising:

a) means for transmitting insurance and other information to said centralized computer data base;

b) means for determining whether insurance has been paid in those places where insurance is required; and c) means for issuing a statement responsive to a determination that insurance, where required, has been paid.

11. The *uniform* system of claim 8 further comprising:

(a) means for transmitting verification of any fee payment(s) to the centralized computer data base and for storing that information;

(b) means for determining whether any and all fees have been paid; and (c) means for issuing a statement responsive to a determination that fees have not been paid.

12. The *uniform* system of claim 8 further comprising:

(a) means for transmitting and storing lienholder data in said centralized computer data base;

(b) means for determining whether liens are open or replicated; and, (c) means for issuing a statement responsive to a determination that liens are open.

13. The *uniform* system of claim 2 further comprising means for updating said history file.

14. The *uniform* system of claim 2 further comprising means for determining that no duplicate second identifying number exists; and, means for determining that the coded first identifying number and second identifying number are mathematically linked.

15. The *uniform* system of claim 2 further comprising:

(a) means for verifying said first, second and third identity numbers;

(b) means for verifying that an encoded second identifying number is a coded version of said second identifying number; and (c) means for issuing a statement in case of error, so that no history file will issue unless said first, second and third identifying numbers are liked together.

16. The *uniform* system of claim 15 further comprising:

(a) means for transmitting and storing tax data in said centralized computer data base;

(b) means for determining whether taxes have been paid; and, (c) means for issuing a statement responsive to a determination that taxes have not been paid.

17. The *uniform* system of claim 2 further comprising [security] means for *securely* transmitting information regarding damage to an article or object, to said centralized data base, and, means for storing said information in said history file so that when the history file is accessed it will reveal such information.

18. The *uniform* system of claim 2 further comprising means for transmitting and storing photo-imagery files.

19. The *uniform* system of claim 2 further comprising an input/output device for reading and transmitting data to said data base.

20. The *uniform* system of claim 2 wherein said system is adaptable for use with independent systems.

21. The *uniform* system of claim 2 further comprising means for mathematically linking the first, second and third identifying numbers so that a mathematical certification of said combination can be proved by congruence.

22. A *uniform* system for tracking ownership to an article or object of value*, tracking independently of preexisting tracking systems,* comprising:

(a) a centralized computer data base;

(b) means for inputting identifying features for an article or object of value;

(c) means for assigning storage locations *in the centralized computer data base* corresponding to certain identifying features of the article or object of value;

(d) means for routing the [specific] *certain* identifying features to [a] *the* corresponding storage [location] *locations*;

(e) means for generating a first identifying number based on the storage locations [for] *of* the *certain* identifying features;

(f) means for creating a history file for the first identifying number;

(g) means for linking the first identifying number with the history file [to create a uniform system of tracking the article of value], said uniform system further having means for accepting and updating data relating to the article object; *and,*

(h) means for providing said uniform system to a plurality of users, so as to enable said users to input data relating to the article or object of value, and instantly receiving updated data relating to the article *or object of value.*

23. The *uniform* system of claim 22 further comprising means responsive to the creation of said first identifying number for creating a mathematically linked and [coded] *shortened, encoded* first identifying number comprised of certain alpha-numeric characters of said first identifying number corresponding to preselected storage locations so that said shortened, encoded first identifying number directly corresponds to said first identifying number and is coded to reveal information about the article or object.

24. The *uniform* system of claim 23 further comprising means for mathematically linking said *shortened, encoded* first identifying number [and said encoded first identifying number to create a uniform system for tracking the history of an article or object independent of preexisting tracking systems] *to the file history*, said uniform system further having means for accepting and updating data relating to the article or object of value.

25. The *uniform* system of claim 24 further comprising means for generating a second identifying number related to said first identifying number.

26. The *uniform* system of claim 25 further comprising means for creating a shortened, encoded second identifying number comprised of certain alpha-numeric characters of said second identifying number corresponding to preselected storage locations so that said shortened, encoded second identifying number directly corresponds to said first and second identifying numbers and is coded to reveal information about the article.

27. The *uniform* system of claim 26 further comprising means for mathematically linking said first identifying number and said second identifying number [to create a uniform system for tracking the history of an article independent of preexisting tracking systems], said uniform system further having means for accepting and updating data relating to the article.

28. The *uniform* system of claim 27 further comprising means for accepting information from external tracking systems, said external tracking systems having a coded first, second or third identifying number.

29. The *uniform* system of claim 23 wherein said coded first identifying number may be applied directly to the article for easy identification.

* * * * *